US008868725B2

(12) United States Patent
Samba

(10) Patent No.: US 8,868,725 B2
(45) Date of Patent: Oct. 21, 2014

(54) APPARATUS AND METHODS FOR REAL-TIME MULTIMEDIA NETWORK TRAFFIC MANAGEMENT AND CONTROL IN WIRELESS NETWORKS

(75) Inventor: Augustine S. Samba, Aurora, OH (US)

(73) Assignee: Kent State University, Kent, OH (US)

( * ) Notice: Subject to any disclaimer, the term of this patent is extended or adjusted under 35 U.S.C. 154(b) by 561 days.

(21) Appl. No.: 12/813,233

(22) Filed: Jun. 10, 2010

(65) Prior Publication Data

US 2010/0318652 A1 Dec. 16, 2010

Related U.S. Application Data

(60) Provisional application No. 61/186,655, filed on Jun. 12, 2009.

(51) Int. Cl.
G06F 15/16 (2006.01)
H04L 12/24 (2006.01)
H04L 12/26 (2006.01)

(52) U.S. Cl.
CPC ......... *H04L 41/5009* (2013.01); *H04L 41/0213* (2013.01); *H04L 43/0894* (2013.01); *H04L 41/5054* (2013.01); *H04L 41/06* (2013.01)
USPC .......................................... 709/224; 709/223

(58) Field of Classification Search
USPC ................................................. 709/223–226
See application file for complete search history.

(56) References Cited

U.S. PATENT DOCUMENTS

| | | | |
|---|---|---|---|
| 4,672,570 A | 6/1987 | Benken | |
| 5,404,496 A | 4/1995 | Burroughs et al. | |
| 5,442,639 A | 8/1995 | Crowder et al. | |
| 5,539,815 A | 7/1996 | Samba | |
| 6,041,343 A | 3/2000 | Nguyen et al. | |
| 6,289,095 B1 | 9/2001 | Buttitta et al. | |
| 6,356,885 B2 | 3/2002 | Ross et al. | |
| 6,788,688 B2 | 9/2004 | Trebes, Jr. | |
| 6,801,940 B1 | 10/2004 | Moran et al. | |
| 6,985,845 B1 | 1/2006 | Pisarsky | |
| 7,020,696 B1 | 3/2006 | Perry et al. | |
| 7,099,879 B2 | 8/2006 | Tacaille et al. | |
| 7,266,532 B2 | 9/2007 | Sutton et al. | |
| 7,295,119 B2 | 11/2007 | Rappaport et al. | |
| 7,295,960 B2 | 11/2007 | Rappaport et al. | |

(Continued)

*Primary Examiner* — Yasin Barqadle
(74) *Attorney, Agent, or Firm* — Hahn Loeser + Parks LLP; Scott M. Oldham, Esq.

(57) ABSTRACT

The invention is directed to network management systems and methods that provide substantially real-time network management and control capabilities of multimedia streaming traffic in telecommunications networks. The invention provides pre-emptive and autonomous network management and control capabilities, and may include shared intelligence of embedded systems—Heterogeneous Sensor Entities (HSE) and the Sensor Service Management (SSM) system. HSEs are distributed real-time embedded systems provisioned in various network elements. HSEs performs fault, configuration, accounting, performance and security network management functions in real-time; and real-time network management control activations and removals. SSM facilitates automated decision making, rapid deployment of HSEs and real-time provisioning of network management and control services. The service communication framework amongst various HSEs and the SSM is provided by the Heterogeneous Service Creation system. The proposed network management procedure provides real-time network management and control capabilities of multimedia traffic in wireless networks and clusters of independent networks respectively.

22 Claims, 19 Drawing Sheets

(56) References Cited

U.S. PATENT DOCUMENTS

| | | |
|---|---|---|
| 7,308,487 B1 | 12/2007 | Dansie et al. |
| 7,316,016 B2 | 1/2008 | DiFalco |
| 7,379,857 B2 | 5/2008 | Piesco |
| 7,730,172 B1 * | 6/2010 | Lewis ............................ 709/224 |
| 7,890,568 B2 * | 2/2011 | Belenki ......................... 709/200 |
| 8,131,838 B2 * | 3/2012 | Bornhoevd et al. ........... 709/224 |
| 2001/0044840 A1 | 11/2001 | Carleton |
| 2007/0277152 A1 | 11/2007 | Srinivasan |
| 2008/0086564 A1 | 4/2008 | Putman et al. |
| 2008/0162637 A1 | 7/2008 | Adamczyk et al. |

* cited by examiner

Table 1.0 Network Management Service Instance Interaction Descriptions

| State | Description |
|---|---|
| Active | Service Instance is currently provisioned on a sensor |
| Cancel | A Service Instance has exceeded the length of retention period in either Failed or Conflict status, and could no longer be restored to Valid status |
| Conflict | The Service Instance contains reference to at least one attribute that is no longer installed in the *SSM system Sensor database* or the *SSM Network Manager database* |
| Failed | SSM is unable to activate a Service Instance in Pending status. |
| In-valid | The Service Domain file fails validation during the HSC service customization process. The file may be corrupt, contain invalid Service Definition attributes, formats and/or values |
| Pending | Service Instance is pending activation |
| Valid | The Service Domain file passes all validations during the HSC service customization process, and is ready to be installed on the SSM system |

| Service Instance Status Interaction Descriptions ||||
|---|---|---|---|
| Service Interaction |||| 
| Label | Name | Type | Description |
| 1 | Create to Valid | HSC Internal | HSC validates Service Domain template, verifies the service customization and determines service is accurate |
| 2 | Create to In-valid | HSC Internal | HSC validates Service Domain template, verifies the service customization and determines service is inaccurate |
| 3 | Valid to Pending | i. HSC system Administrator<br>ii. SSM system Internal | i. The HSC administrator initiates request to re-activate a Valid Service instance<br>ii. SSM system changes the Service Instance status from Valid to a transient state: Pending |
| 4 | Active to Valid | SSM system Internal | In order to modify an existing active service instance, the SSM system retires the active service instance by changing its status from Active to Valid. The old service is replaced by the newly acquire service from the HSC. |
| 5 | Pending to Active | SSM system Internal | SSM sets the Service Instance status from Pending to Active using one of the criteria:<br>i. After successfully retiring the Service Instance from Active to a Valid state<br>ii. No Service Instance exists in Active state |
| 6 | Pending to Failed | SSM system Internal | SSM system sets the Service Instance status from Pending to Failed after an unsuccessful attempt to retire the Active Service Instance |
| 7 | Failed to Valid | SSM system GUI | End user initiates request to modify/restore a failed Service Instance. The SSM system initially verifies the modified Service exists before changing the status from Failed to Valid |
| 8 | Valid to Conflict | SSM system Internal | The SSM system detects one or more inconsistent Service Definition attributes associated with a Valid Service Domain.<br>The following is a scenario for the latter:<br>*Every Service Domain contains a reference to a set of attributes -Sensor type, protocol and other unique host sensor attributes, which are installed in the SSM system Sensor database. If, however, one of these attributes is deleted from the database, but referenced in a Service Definition for a Valid Service Domain, then the Service Definition will be inconsistent, and its Service Domain/Instance will automatically transition to a status of "Conflict"* |
| 9 | Conflict to Valid | HSC system Service Modification GUI | The HSC end user initiates request to correct all inconsistent Service Definitions then submits the revised Service Domain for validation. HSC internal validates the modified Service Domain prior to changing the status to Valid |
| 10 | Failed to Cancel | SSM system GUI | The SSM system end user initiates a request to retire a Failed Service Instance |
| 11 | Conflict to Cancel | SSM system GUI | The SSM system end user initiates a request to retire Service Instance in Conflict status |

Figure 16

Example 1: Pre-emptive Optimal Diagnosis

| 0 | 0 | 0 | 0 | 0 | 0 | 0 | 0 | 0 | 0 |
|---|---|---|---|---|---|---|---|---|---|

Example 2: Stable but less optimal Diagnosis:

| 0 | 0 | 0 | 1 | 1 | 0 | 0 | 1 | 0 | 0 |
|---|---|---|---|---|---|---|---|---|---|

Example 3: Minor Configuration Alarm Diagnosis:

| 0 | 1 | 0 | 1 | 0 | 0 | 0 | 0 | 1 | 0 |
|---|---|---|---|---|---|---|---|---|---|

Example 4: Minor Configuration Alarm Diagnosis:

| 1 | 1 | 1 | 0 | 1 | 0 | 0 | 0 | 0 | 0 |
|---|---|---|---|---|---|---|---|---|---|

Example 5: Optimal Security Response:

| 0 | 0 | 1 | 0 | 1 | 0 | 0 | 0 | 0 | 0 |
|---|---|---|---|---|---|---|---|---|---|

Example 6: Stable, but less optimal Security Response:

| 0 | 0 | 1 | 0 | 1 | 0 | 1 | 0 | 0 | 0 |
|---|---|---|---|---|---|---|---|---|---|

Example 7: Minor Security Alarm Response:

| 0 | 1 | 1 | 0 | 1 | 1 | 0 | 0 | 0 | 0 |
|---|---|---|---|---|---|---|---|---|---|

Figure 18

APPARATUS AND METHODS FOR REAL-TIME MULTIMEDIA NETWORK TRAFFIC MANAGEMENT AND CONTROL IN WIRELESS NETWORKS

CROSS-REFERENCE TO RELATED APPLICATIONS

This patent application claims the benefit of U.S. Provisional Patent Application No. 61/186,655, filed Jun. 12, 2009, the disclosure of which is expressly incorporated by reference herein.

FIELD OF THE INVENTION

The present invention relates to network management procedures, and particularly to a real-time network management and control system for multimedia streaming traffic in telecommunications networks, such as 4G wireless networks.

BACKGROUND OF THE INVENTION

Current network management procedures are concerned primarily with monitoring aspects, which do not provide real-time control capabilities. Network management involves a set of activities and techniques that are required to plan, design, control, maintain and grow a network infrastructure and its associated services. These activities include monitoring the network and the ability to take prompt action to efficiently maintain the service-level objectives and to control the flow of traffic when necessary. The OSI reference model classifies network management functions into five functional areas: fault management, configuration management, accounting management, performance management, and security management. These functions are collectively referred to as "FCAPS". Network management activities also include detection, identification, investigation and resolution of faulty network elements and transmission facilities. In the 3G wireless networks and prior telecommunications environment, network monitoring is accomplished by logically connecting the network elements to remote Element Management Systems, which are under the control of one or more Network Management Systems (NMS). The NMS is collocated with various Operations Support Systems in a Network Operations Center (NOC). Effective network management depends on the coordination of controls across the various Element Management Systems. These controls may include schedule changes, provisioning, fault and configuration management modifications. In today's environment, control coordinations are handled by NOC engineers/operators through manual procedures, which present a number of setbacks for the complex and heterogeneous real-time multimedia traffic in 4G wireless networks. The Simple Network Management Protocol (SNMP) framework is the dominant industry standard. The SNMP framework consists of three key elements: The standard Management Information Base (MIB), The Structure of Management Information (SMI), and The Simple Network Management Protocol (SNMP). Despite its popularity, the SNMP framework has a number of disadvantages. The SNMP framework assumes a static managed object. Every data item must be carefully pre-defined, including its type, size and access restrictions before it can be used in the MIB.

With the complexity of real-time multimedia traffic streams across different bandwidths of wireless and wired networks, it would require tremendous time, effort and patience to accurately pre-define the wide variety of managed objects for real-time multimedia traffic in the wireless and wired networks, such as 4G networks. Moreover, modeling the characteristics of real-time multimedia traffic as static objects may lead to inaccurate representations. To retrieve SNMP data items (i.e., discrete values), the manager must periodically obtain/poll all the discrete values associated with the object(s); the manager stores the values, and determines whether the retrieved values are of interest then constructs complimentary information, which identifies implementation of appropriate network management functions. The lack of direct filtering mechanism makes real-time network management process cumbersome. The periodic polling of SNMP discrete values for multimedia traffic over a WAN connection consumes a lot of bandwidth, which may contribute to network traffic congestion due to the large volumes of diverse data items (i.e., attributes) associated with real-time multimedia traffic managed objects. The length of the pooling period, accompanied by the data analysis of the discrete values and subsequent information construction phases introduce latency, which is undesirable for real-time video communications.

Second-generation (2G and 2.5G) wireless systems, such as CDMA, GSM and IS-95 were designed primarily to transport speech and low-bit rate data in non real-time. A service provider's 2G or 2.5G wireless network is primarily homogeneous, and therefore easily managed by employing standards defined by the International Telecommunications Union for network management, such as Common Management Information Protocol (CMIP), Telecommunications Management Network (TMN) protocol.

The Third-generation (3-G) wireless networks support higher bit rate data, along with convergence of speech and data traffic. The 3-G systems including CDMA2000, UMTS, GPRS and WiMax were developed independently to target different service types and high bit-rate data services. The 3-G network management paradigm procedure is non-integrated. The International Mobile Telecommunications-2000 (IMT-2000) provides a family of standards for the telecommunications services. However, the SNMP is widely used for data services.

The Fourth-generation (4-G) wireless network paradigm, on the other hand, is designed to provide higher-bit rates for real-time video, voice and data traffic, which may traverse multiple wireless network technologies with different quality of network element technologies (reliability—Fault, Configuration), billing methods (Accounting), quality of service (QoS) levels (Performance) and Security policies. Hence A 4-G mobile user may concurrently connect to different QoS wireless networks with the expectations of higher-bit rates for real-time video, voice and data streams. Effective real-time network management methodology is therefore necessary in order to maintain higher-bit rates for real-time traffic. More particularly, it would be desirable that in the 4G wireless networks:

Equipment failures should be minimized and the potential impact of Faulty equipment resolved in real-time The design of universal end-user terminals (and wireless network elements) to operate in different wireless networks imposes a new level of complexity (e.g., size, power consumption, operating systems) for a 4-G device Configuration. Configuration failures should therefore be resolved in real-time Multiple operators may have different billing/Accounting systems. A mobile 4-G end-user's accounting information may be collected and managed from multiple wireless service providers. The end-user Accounting information should be collected seamlessly from the originating, transit and terminating nodes in various networks in real-time in order to provide detailed and accurate billing information to the 4-G mobile end-user Degradation of end-to-end QoS for multimedia services that span multiple networks, IP and non-IP based systems should be detected and corrected in order to provide acceptable Performance levels in real-time Different wireless networks may have varying levels of security. Hence to maintain uniform security across the originating, transit and terminating networks, it would be desirable to provide real-time Security across the impacted networks Today's network management procedures are reactive. To effectively manage real-time multimedia traffic in wireless networks, namely 4G wireless networks, there needs to be a paradigm shift from a reactive approach to a distributed, fully integrated, pre-emptive real-time network management and real-time control framework.

SUMMARY OF THE INVENTION

It is, therefore, an object of the invention to provide a network management system which can overcome the above problems. A novel network management procedure to facilitate real-time network management and real-time control capabilities of multimedia traffic in wireless networks, more particularly 4G wireless networks is proposed. The methodology provides pre-emptive network management and control capabilities. The methodology is based on the shared intelligence of distributed Heterogeneous Sensor Entities (HSE) and a Sensor Service Management (SSM) system. The HSEs are distributed real-time embedded systems provisioned in various network elements (nodes). The HSE performs fault, configuration, accounting, performance and security network management functions in real-time; and real-time network management control activations and removals in both wireless and wired network elements. The SSM system facilitates automated decision making, rapid deployment of Heterogeneous Sensor Entities and real-time provisioning of network management and control services. The service communication framework amongst various HSEs and the SSM is provided by the Heterogeneous Service Creation (HSC) system. The HSC creates the heterogeneous service elements for Fault, Configuration, Accounting, Performance and Security network management functions, and network management controls. The HSC, SSM and HSE framework provides an integrated view of real-time network management and control capabilities for wired and wireless networks, such as 4G wireless networks, and clusters of disparate (independent) networks. The independent networks include standalone wired voice networks, like Legacy, cellular networks, data networks, and/or cable networks, belonging to another domestic or international service provider, which provide a transit route for real-time multimedia streams originating from or terminating at a 4G wireless network for example. When a service provider utilizes clusters of physically independent networks to provide real-time multimedia services to its end-users, the voice, video and data traffic could be individually transported over a converged network, consisting of Public Switched Telephone Networks, cable networks, data networks and other possible networks. This invention provides real-time network management and control capabilities of multimedia traffic for both wireless networks and converged networks.

BRIEF DESCRIPTION OF DRAWINGS

FIG. 16 is a table of terms and definitions for the different states and state transitions for FCAPS service instances.

FIG. 18 illustrates diagnosis examples of the Bit Vectors of FIG. 17.

DETAILED DESCRIPTION OF THE INVENTION

Figure 1A:
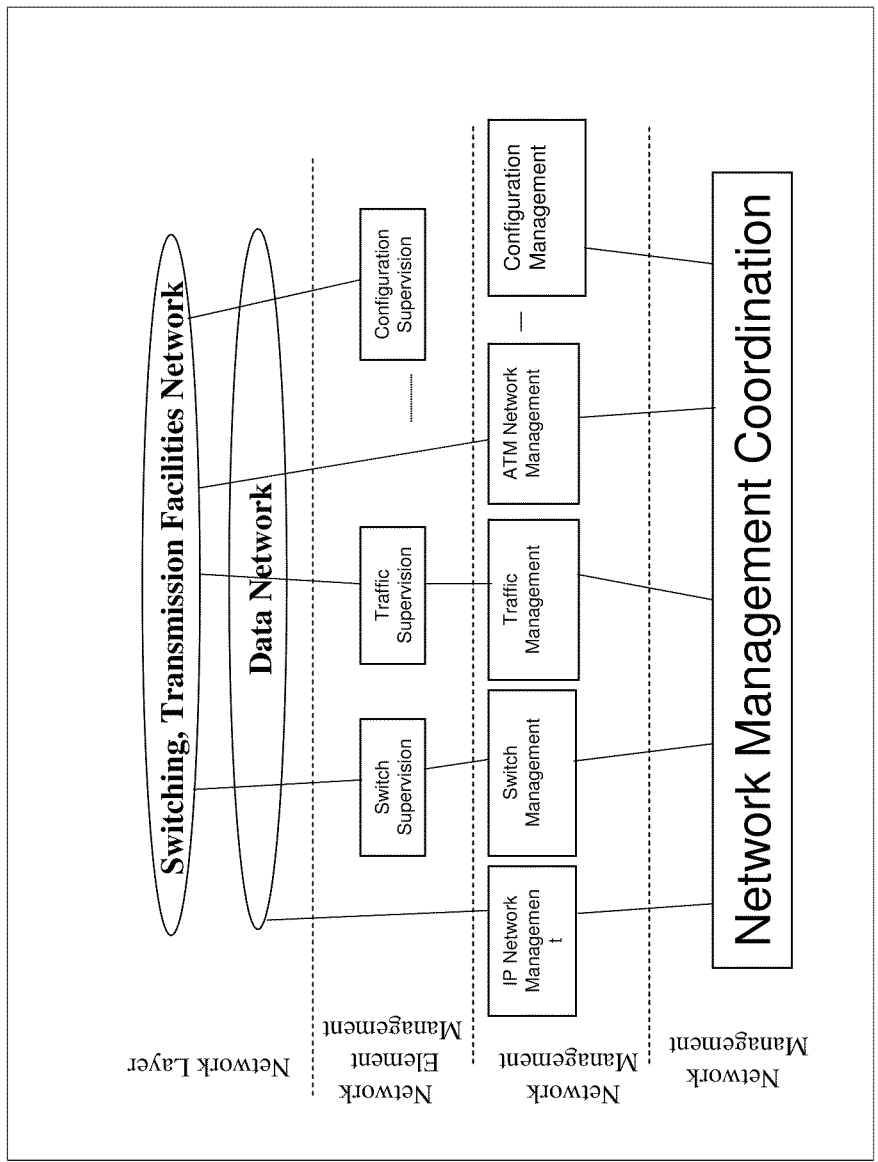
FIG. 1(a) is a schematic illustration of a centralized network management (prior art)

Various features of selected embodiments of this invention will now be described with reference to the figures. The spirit and scope of the invention is not limited to the embodiments selected for illustration. Furthermore, the system may vary as to configuration and details of the parts, and that the method may vary as to the specific steps and sequence, without departing from the concepts as disclosed herein.

In order to clarify certain aspects of the embodiments disclosed hereafter, various terms used herein are defined.

An edge router—is a device that routes packets between a logical network and the core routers.

Core router—is a device that may route packets to an edge router and nodes within a network, the core router typically resides within the middle or backbone of the LAN.

Access router—A device used to connect remote sites. This router is required at both ends of the remote sites and provides the protocol conversion between the LANs over the WAN.

Active State—See FIG. 16 Table 1.0

Cancel State—See FIG. 16 Table 1.0

Conflict State—See FIG. 16 Table 1.0
Failed State—See FIG. 16 Table 1.0
In-valid State—See FIG. 16 Table 1.0
Pending State—See FIG. 16 Table 1.0
Valid State—See FIG. 16 Table 1.0

The present invention relates to the aspects of network management system, such as real time network management, which may be applied in a range of networks, simple or complex. A basic element of a network typically includes hardware, software, and protocols. The interrelationship of these elements constitutes a network infrastructure. The network infrastructure is the topology in which nodes, any device connected to a network (e.g., computer, personal digital assistants (PDAs), cell phones, printer, or any device with an internet protocol address), of a local area network (LAN), a metropolitan area network (MAN), wide area network (WAN) or an international gateway network as examples, are connected to each other. These connections involve network elements (i.e. routers such as edge, core and access routers, switches, bridges, PDAs, servers, modems and hubs) using cables (i.e. copper or fiber) or wireless technologies. If a network is thought of as a means of transport, the network protocols are the "traffic rules". The network protocols define how devices in the network communicate. For example, network protocols include such specifications as the methods that can be used to control congestion in the network and how application programs will communicate and exchange data. Key areas in network management include network operations, security, and problem determination. Because businesses depend heavily on the availability of data processing systems, problems in the network must be addressed quickly. Some symptoms of a network that need to be addressed immediately might include error messages, unusual network traffic, load balancing, service degradation, slow response time, no system response or low throughput. One embodiment of the present invention relates the decreasing the response time for addressing these problems. The embodiment hereafter details how a real-time multimedia network traffic management and control system functions.

1. Real-Time Network Management and Control Infrastructure

Figure 3:
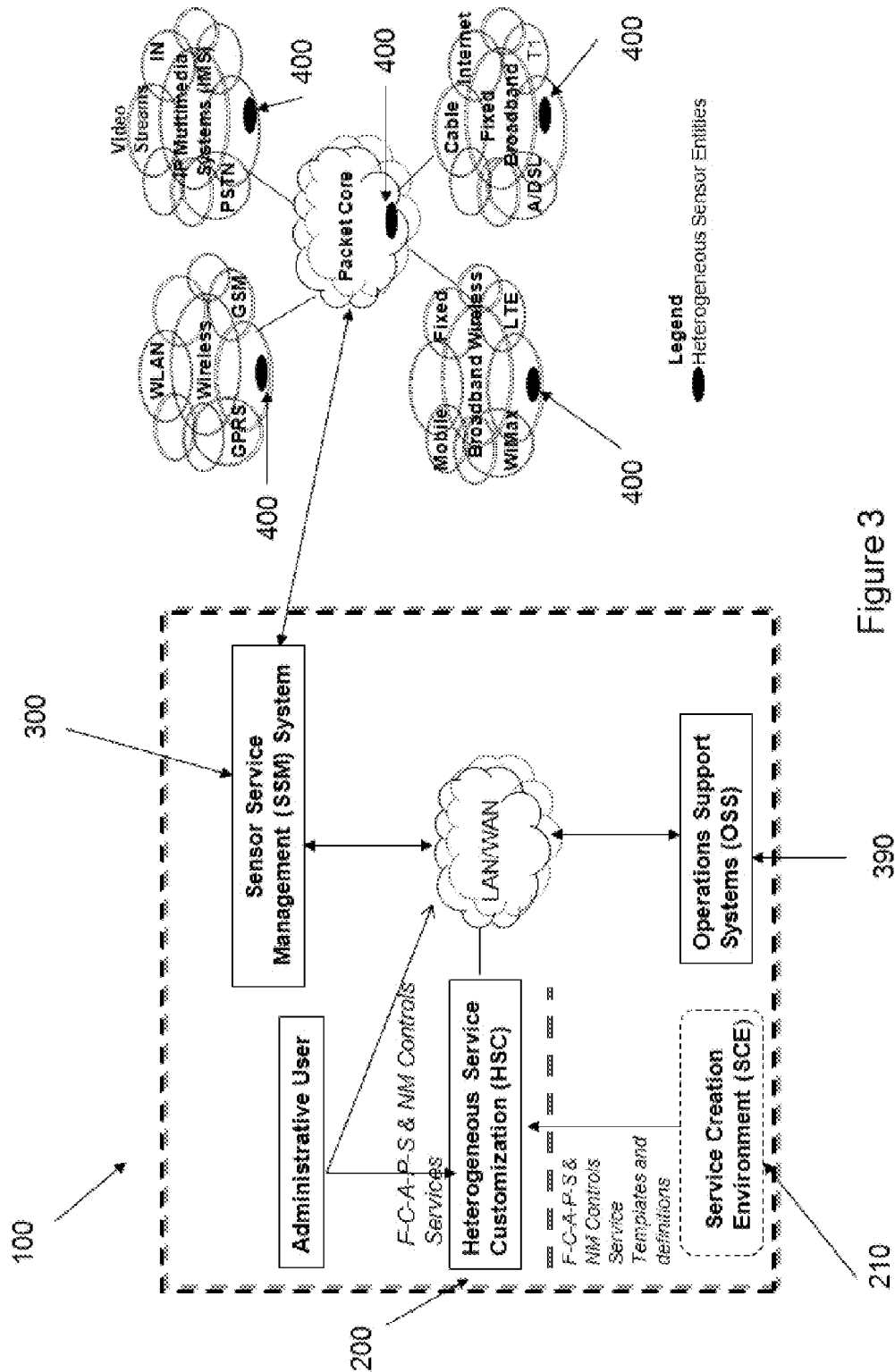
FIG. 3 is a schematic illustration of for real-time Multimedia Traffic Network Management System framework.

With reference to FIG. 3, one embodiment of a system and apparatus for multimedia network traffic management and control according to an example of the invention (herein referred to as the "Model") 100 may comprise a Heterogeneous Service Customization system (HSC) 200, a Sensor Service Management System (SSM) 300, and a Heterogeneous Sensor Entity (HSE) 400. As used herein the term heterogeneous refers to comprising dissimilar elements or parts (e.g., a heterogeneous network, may comprise of routers including edge, core and access routers for example, computers with different operating systems, additional devices like cell phones, printers, or PDAs, all being interconnected within the same network). The Model 100 provides latency-free communication, and seamless reliable delivery of heterogeneous multimedia services amongst a wide variety of multi-access end user technologies and distributed services. In a functioning environment, the Model 100 may have a user who may access the SSM 300 via a graphical user interface (GUI). The GUI may communicate with the SSM 300 using a metropolitan area network (MAN), local area network (LAN), a wide area network (WAN), or by any other means known to a person having ordinary skill in the art. Direct access to the SSM 300 is also possible, however accessing the SSM 300 via the MAN, LAN, WAN, or the like, improves performance of the Model 100. Additionally, the user may have direct access to the HSC 200, or access may be established using a MAN, LAN, WAN, or by any current or future technology and other means known to a person having ordinary skill in the art.

Figure 7:
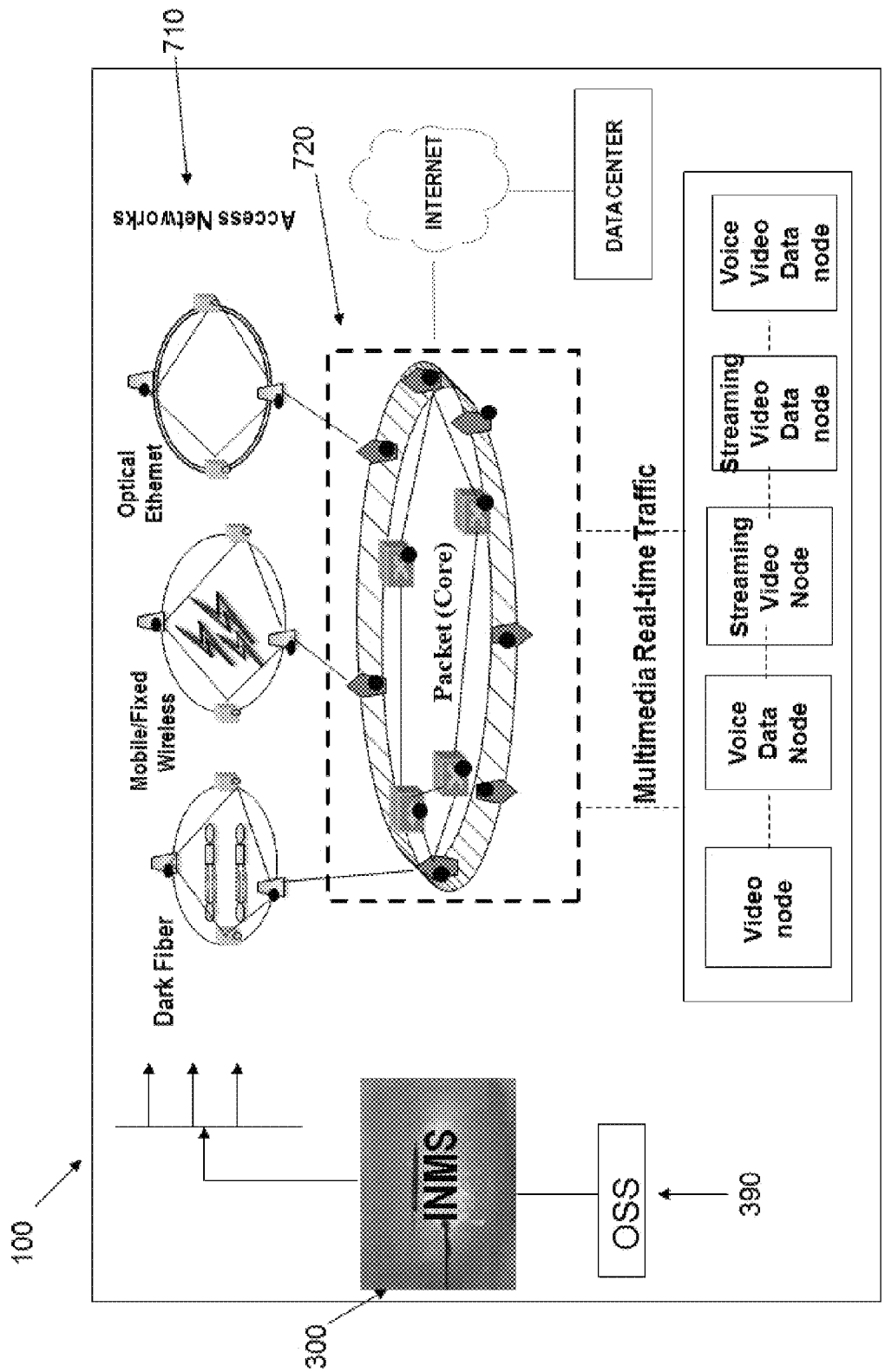
FIG. 7 is a schematic illustration of a context diagram for an integrated network management framework logical partitioning of a network infrastructure.
Figure 8:
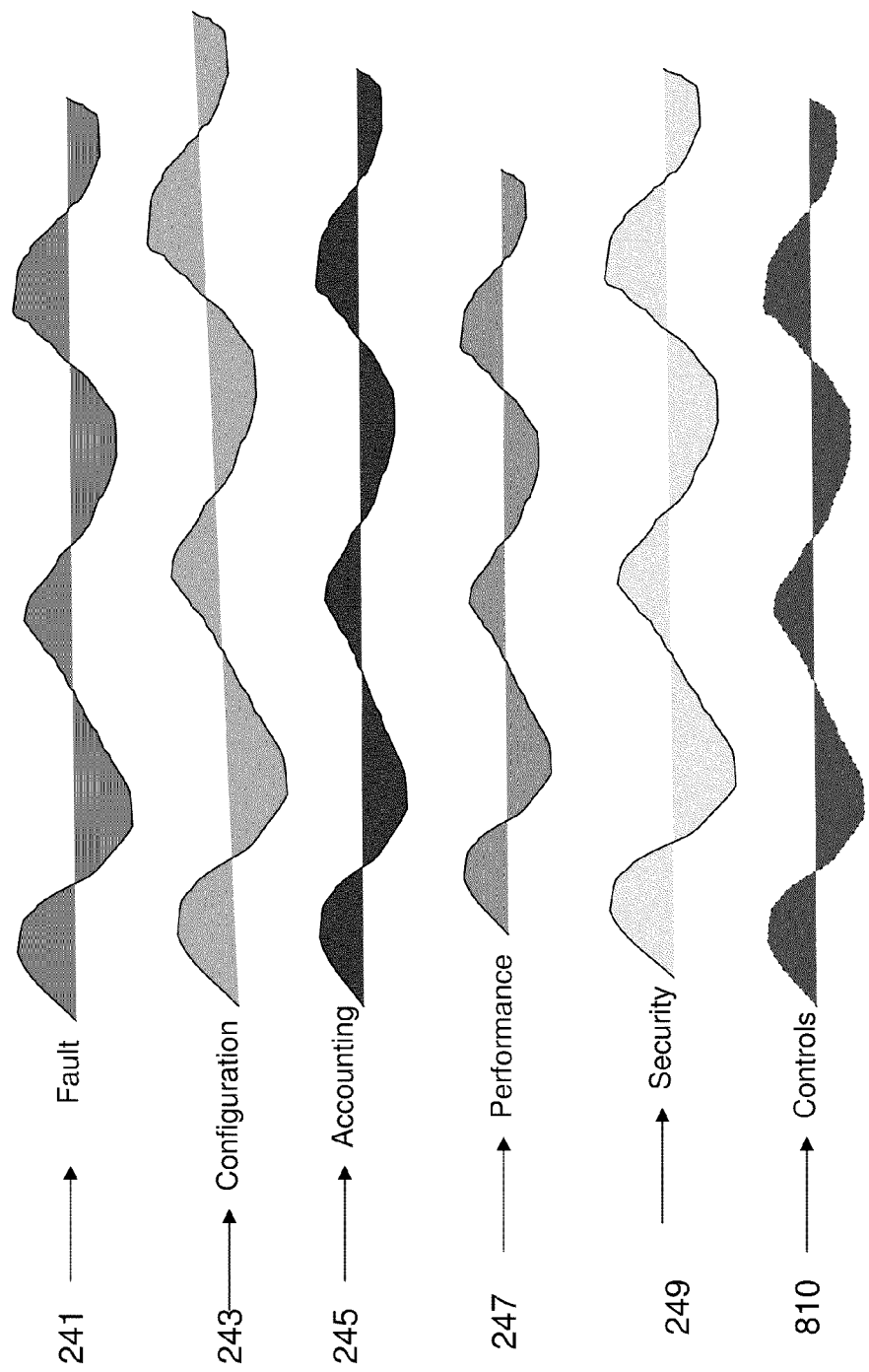
FIG. 8 illustrates real-time network management functions and control capabilities as continuous streams of service elements.

Additionally, the Model 100 may comprise a Service Creation Environment (SCE) 210. The SCE 210 may provide the Model 100 with services ready for deployment or customization. If a service provided by the SCE 210 requires customization, the service may be communicated to the HSC 200 for customization. Communication between the SCE may be direct, or via a MAN, LAN, WAN, or any other means known to a person having ordinary skill in the art. As illustrated in FIG. 3, the SSM 300 communicates with a packet core network, working with the HSE 400 in real-time. Each network in the packet core is independent from one another. For example, one packet core network may include a fixed broadband network, 3G and cellular wireless networks employing internet protocol multimedia system (IMS), as well as a broadband wireless 4G networks. In this example, each individual network includes at least one HSE 400 in its nodes. Each node communicates with the packet core network node, which may be managed by the SSM 300. The SSM 300 may also communicate with a variety of core networks. These networks may include Internet Protocol (IP) core networks, Dense Wavelength Division Multiplexing network, or any other network known to a person having ordinary skill in the art. However, for illustrative purposes a Packet Core network is provided in FIG. 3. With reference to FIG. 7, the Model 100 provides latency-free communication, and seamless reliable delivery of heterogeneous multimedia services by logically portioning networks into an Access Network Domain 710 that may facilitate multi-technology, multi-access and higher-speed bandwidth, and a Core Network Domain 720 that may facilitate convergence of higher throughput data and voice networking, multi-access network technologies, and heterogeneous protocols and services. As illustrated in FIG. 8, the HSC 210 creates a set of Heterogeneous real-time Network Management Service Applications for Fault 241, Configuration 243, Accounting 245, Performance 247, and Security 249 (collectively referred to as "FCAPS") and Network Management Control 810. For example, a security specialist uses the HSC to create a set of parameters for the Security 249 application for use in the Model 100. The HSC 200 transforms the FCAPS service elements templates based on the managed device's type and surroundings. Managed devices may be any device (i.e. nodes, network elements, etc.) used within the model 100. The HSC validates and builds the service executables. The service elements are installed on the SSM 300, where the SSM 300 manages the state of each service element. The waves illustrated in FIG. 8 are service waves which are not required to be uniform with one another. Additionally, the service waves demonstrate a continuous stream of network management, which is a departure from the traditional discrete network management procedure. For purposes of this figure, the wavelengths appear in similar size and frequency to show a system that is continuous and streaming in real-time.

For example, an HSE 400 used to emulate network security may use a service element template customized to emulate internet traffic and control for the device that HSE 400 is emulating. The SSM 300 may communicate with the HSE 400 using two mediums, the Access 710 and Core 720 Networks as the primary transport medium, and an Heterogeneous Sensor Network (HSN) as the secondary transport medium. The HSN is a packet network, designed to carry bit-mapped Vectors of network management information amongst HSE(s) 400, and SSM 300. Bit-mapped Vectors may be a bit sequence having Boolean values. Preferably, multimedia traffic is carried over the Access 710 and Core 720 Networks. HSN bit-mapped vectors may be carried over the Access 710 and Core 720 Networks depending on the multimedia traffic load-levels. Communication within the Model 100 may be established using wired technologies (i.e. copper, fiber, etc. . . . ) or wireless technologies (i.e. LTE, WiMax, wi-fi, GSM, CDMA, etc. . . . ) or any other means known to a person of ordinary skill in the art. The Model's 100 functionality is independent of the type of network connectivity.

Figure 2:
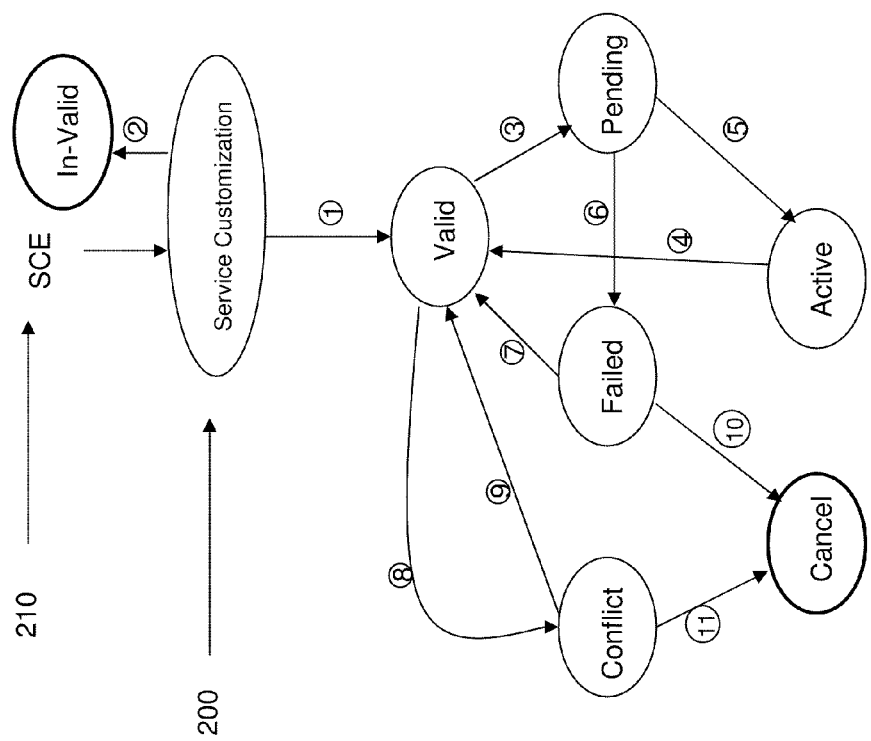
FIG. 2 is a schematic illustration of FCAPS Service Version Management.

With reference to FIG. 2, a description of the deployment of the FCAPS and Control services deploy in the Model 100, and the states in which they exist in every sense of time is described. For illustrative purposes, the Fault Management System is used to show the deployment and states in which each service exists. Any of the FCAPS and Control management systems may be used within this description. For example, with reference to FIG. 3, when a user creates a service in the SCE 210, this service is sent to the HSC 200, which then validates the service. If valid, the HSC 200 assigns a state of valid. If invalid, the HSC 200 returns the service to the SCE 210. If valid, the HSC 200 will send the service to the SSM 300 (see FIG. 3), where the service resides and awaits deployment. The service resides in the FCAPS database 1415 (see FIG. 14), which serves as a repository. When you have a service that is valid, it resides in the SSM 300. From here the service goes to a pending state. Here a user may change the service or provision the service. To provision the service, the user may initiate a request to activate or reactivate a valid service instance. Here the service goes from valid to pending. The SSM 300 changes the status of the service. The change from a pending state to an active state is made based on one of the descriptions listed in FIG. 16. (See Table 1.0 for the list of Service Instance Status Interaction Descriptions.) Furthermore, with a Fault management service, the SSM 300 puts the valid state into an active state, and then looks to the sensor to see if a state already exists on the sensor. The SSM 300 will first try to retire the old state on the sensor, then bring the new state to valid and replace the retired state. Once the state is retired, the sensor may be absent a state, until the new state is provisioned.

2. Heterogeneous Service Customization (HSC) System

Figure 4:
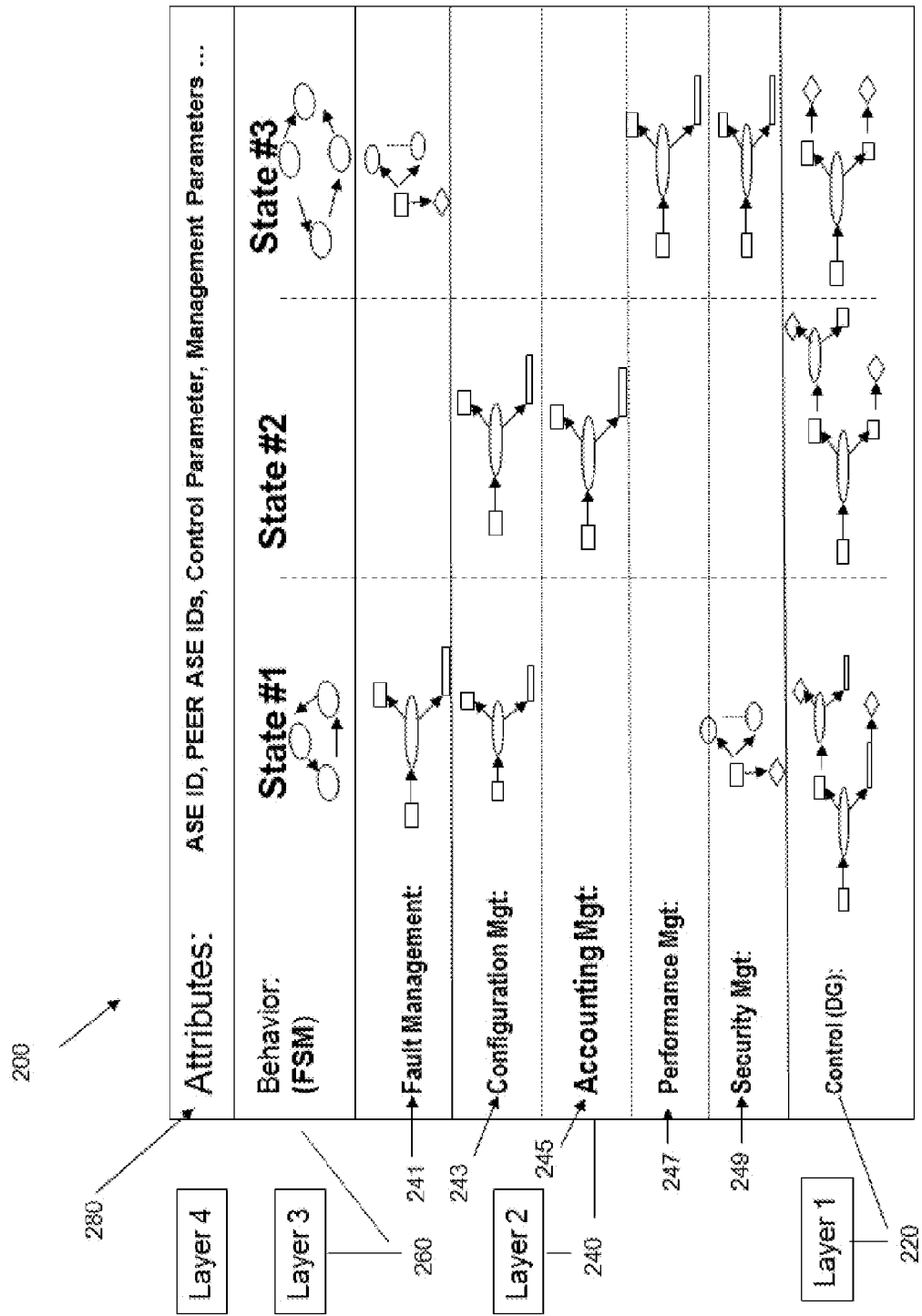
FIG. 4 is a schematic illustration of network management service creation model.

One function of Heterogeneous Service Customization (HSC) System 200 is to create a set of heterogeneous Network Management Service Applications for FCAPS and Traffic Control. With reference to FIG. 4, the HSC 200 architecture may be comprised of four layers, a Network Management Control Layer 220, a Network Management Function Layer 240, a Behavior Layer 260, and an Attribute Layer 280. The Network Management Control Layer 220 may provide extensions to the Open System Interconnection (OSI) network management reference model. The Network Management Control Layer 220 layer may specify the procedures for activating and removing network management controls used by the HSE 400. The Network Management Control 220 allows the HSE 400 to alter the flow of traffic in the network in support of the network management's objectives. The Network Management Controls 220 may be mapped to individual states defined by a State Machine (SM), which defines and emulates the transition of pertinent operations for a given Network Element. Programmable Decision Graphs may be employed to activate and remove Network Management Controls 220. Decision Graph is defined as a template of defined parameters.

The Network Management Function Layer 240 may be comprised of five distinct entities representing Fault Management 241, Configuration Management 243, Accounting Management 245, Performance Management 247, and Security Management 249. Each continuous and streaming service entity may be defined based on a set of discrete states representing a set of conditions, and a set of events of the managed network element. Programmable decision graphs may be used to control the execution of the network management function 240 for each device.

The Behavior Layer 260 may represent the operations of the managed Network Element as a set of State Machines. This layer 260 provides a software abstraction of the network element's behavior. The Attribute Layer 280 may describe the characteristics of an HSE 400 and the managed node. For example, the Attribute Layer 280 may describe some characteristics such as the HSE 400 network domain ID, or Supervisory and Control parameters.

3. Sensor Service Management (SSM) System

One function of Sensor Service Management (SSM) System 300 may be to create heterogeneous service elements by customizing the HSC 200 service element templates, based on monitoring and control requirements of the HSE 400. These requirements are derived from the HSE's 400 managed device types, device functions and its local surroundings. Additionally, the SSM 300 may partition the Access 710 and Core 720 networks into logical network clusters, which are groups of linked nodes, working together closely for improving performance and/or availability over what would be provided by a single node. Each cluster may be characterized by a graph representing a set of nodes, network elements and other managed device types. Also, the SSM 300 provisions executable code versions (service codes) of the service element templates to the appropriate HSE 400 applications in real-time. Executable codes are typically instructions for a node, in a form the node can directly use (i.e. execute). Communication between the SSM 300 and the HSE 400 is established using bit-mapped vectors for example. The provisioning dynamically incorporates the service codes into the HSE 400 applications. The SSM 300 may also receive audit or query requests from at least one Operation Support Systems (OSS) 390 to audit or query the status of remote managed nodes through the HSE 400. Communication within the Model 100, between the SSM 300 and the HSE 400 is in real-time. A second function of the SSM 300 may be to serve as a repository. For example, when you have a service in a Valid state, it resides in the SSM 300. From this point, the Valid state goes to a Pending state. At this point a user may change the service or provision the Pending state service. To provision, the user may initiate a request to activate or reactivate a Valid state's service instance. The SSM 300 may then change the status. At this point the state goes from Valid to Pending. Later the state is changed from Pending to Active based on one of the possible criteria given in FIG. 16 Table 1.0. An example of a change in states for fault management services is set forth. The SSM 300 puts the valid state into an active state, then looks to the sensor to see if a service already exists on a sensor. The SSM 300 will first try to retire the old state on the sensor by sending a message to the sensor. The SSM 300 will then try to bring the new state to valid and replace the retired state on the sensor. At the point where the state is successfully retired by the SSM 300, the sensor may have no states until the new state is provisioned by the SSM 300. If the SSM 300 fails to retire the active state, the SSM 300 will move the new state status from Pending to Fail. When the service is in a Fail state, a user may initiate a request to modify or restore a service state. A state may Fail for a number of reasons, for example, if a node is down, or if the network is down. Once a verification of the node, network or other reason causing the Fail state is restored, the SSM 300 will begin the process again from Valid to Pending, and moves forward until the state is Active.

In an example of the invention, there is provided a system and method operable in conjunction with real-time management of Fault, Configuration, Accounting, Performance, Security and Control for updating information items in elements of wireless and converged network nodes and in the Sensor Service Management System. An example method comprises the steps of: (a) a sensor service management system defining and maintaining a master or golden copy of the network configurations, sensor attributes and network elements; (b) the sensors determining which information items of said network elements are of a type which must change in real-time based on a pre-emptive diagnostics of network elements and network clusters; (c) the sensor systems generating instructions to the Service Management System and other sensors using bit mapped vectors to represent real-time status of network elements, network management types (FCAPS) and Control; and non-optimal components of network elements; (d) responsive to the instructions from a sensor, the recipient sensor performs real-time analysis and determines corrective actions to maintain optimal network operations and network services; (e) responsive to the instructions from the sensor system, the sensor service management system updates the master or golden copy of the network topology and network element attributes; and the sensor service management instructs operation support systems about the real-time status of the network and components of the network elements. The method may further comprise the step of: the sensor systems performing real-time control of heterogeneous streams of Fault, Configuration, Performance, Accounting, Security and Control services in wireless and converged network element nodes. Additionally, the method may further comprise the step of: the sensor service management system performing real-time provisioning of heterogeneous streams of Fault, Configuration, Performance, Accounting, Security and Control services in wireless and converged network element nodes. Yet further, the method may further comprise the step of: the service creation system and the sensor service management system performing service version management for Fault, Configuration, Performance, Accounting, Security and Control service instances.

Figure 5:
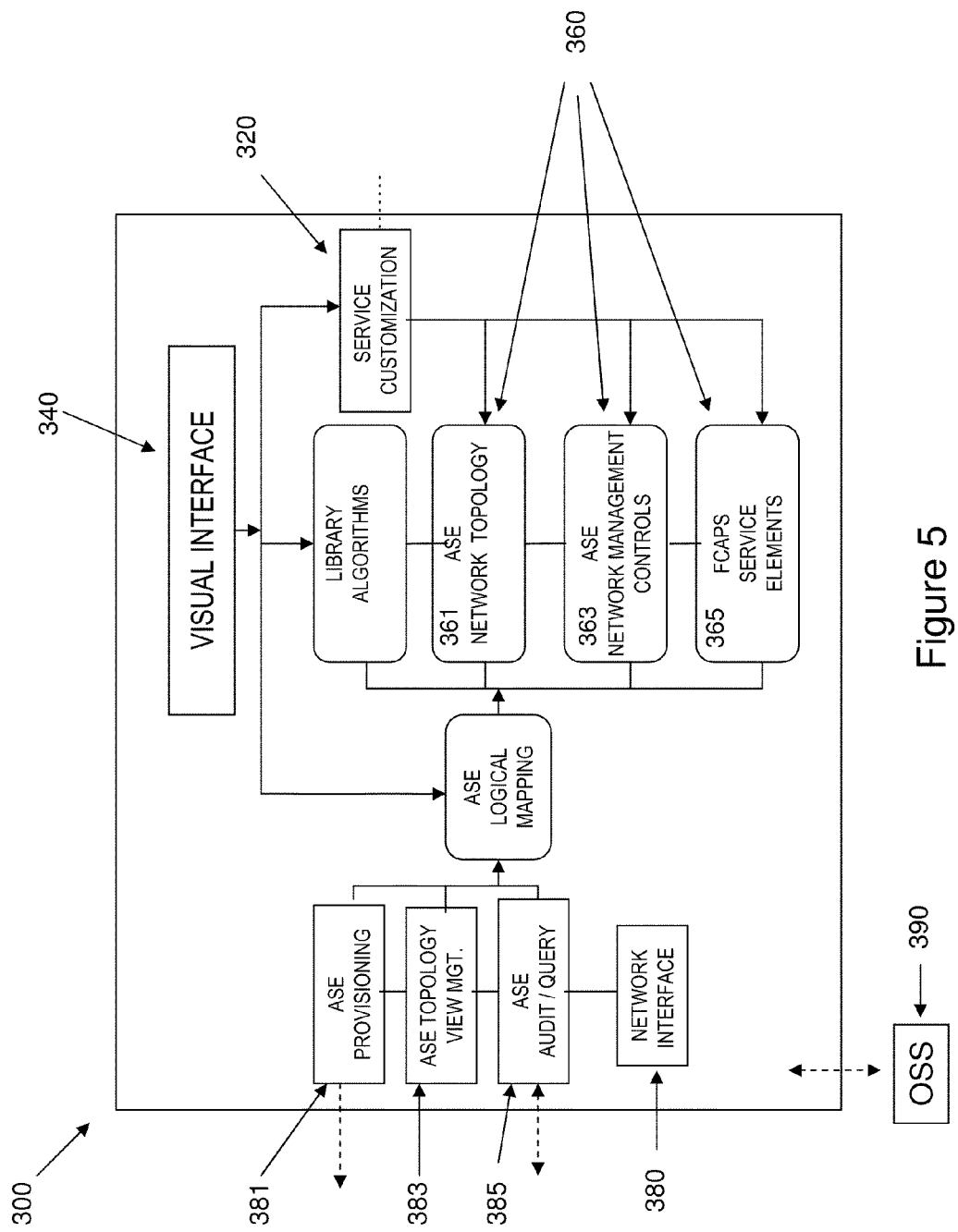
FIG. 5 is a schematic illustration of an integrated network management architecture.

With reference to FIG. 5, one embodiment of the SSM 300 architecture may comprise four components, a Network Management Service Creation Interface (NM-SCI) 320, a Visual Interface 340, a Host 360, and a Network Element and Operation Support Systems Interface 380. The NM-SCI 320 allows the FCAPS service and control templates to be installed on the SSM 300. The Visual Interface 340 provides support for administrative and service customization. For example, types of Visual Interfaces 340 may be a web browser, graphical user interface (GUI), or any other interface known to a person having ordinary skill in the art. The interface 340 may be used by a security specialist to customize the security traffic control service elements to the requirements of the HSE 400. Types of service customizations may include validation, verification, editing of decision graphs, specifications of attributes, exceptions, threshold values, administrative policies, and constraints. The service customizations may be stored on the SSM 300 and provisioned to an HSE 400.

The Host 360 may comprise of subsystems including an HSE/CHSE Network Topology 361, HSE/CHSE Network Management Controls 363, and FCAPS Service Elements 365. The HSE/CHSE Network Topology Subsystem 361 may partition the Access 710 and Core 720 network topology into logical clusters, and creates graph representations of each cluster. Each cluster comprises an HSE 400. Each graph representation may be represented by a set of nodes within the cluster. The HSE/CHSE Network Topology Subsystem 361 may maintain a copy of the logical network topology. Additionally, the SSM 300 may configure an HSE 400 as a supervisory HSE 450, in both the Access 710 and the Core 720 Network's clusters. The HSE/CHSE network management control subsystem 363 is the set of all executable network management controls defined for both the Access 710 and Core 720 network topologies. The HSE/CHSE Network Management Control Subsystem 363 may maintain the copy of all controls, which may include administrative policies provisioned to the HSE 400. The FCAPS Service Element Subsystem 365 is the set of executable customized services defined for FCAPS. The FCAPS Service Element Subsystem 365 may maintain a copy provisioned to the HSE 400.

The Network Element and Operations Support Systems Interface 380 may comprise a Service Provisioning Subsystem 381, a View Management subsystem 383, and an Audit-Query subsystem 385. The Network Element and Operations Support Systems Interface 380 may facilitate real-time communications with the HSE 400, and communications with an Operating Support Systems (OSS) 390. The OSS 390 may be autonomous. The Service Provisioning Subsystem 381 may distribute service codes to the HSE 400 in real-time. The process of distribution may include the capability to insert service codes, delete existing service codes or modify components of service codes on the HSE 400. The View Management Subsystem 383 may create and manage integrated views of an end-to-end network. The View 383 may provide snapshots of the health of the network elements and the network topology. The Audit-Query Subsystem 385 may manage schedule and real-time audits/queries of the HSE 400. The Audit-Query 385 may be initiated by either the OSS 390 or end-users via the Visual Interface 340. The OSS 390 computes the detailed network management analysis of the Access 710 and Core 720 network clusters.

Figure 9:
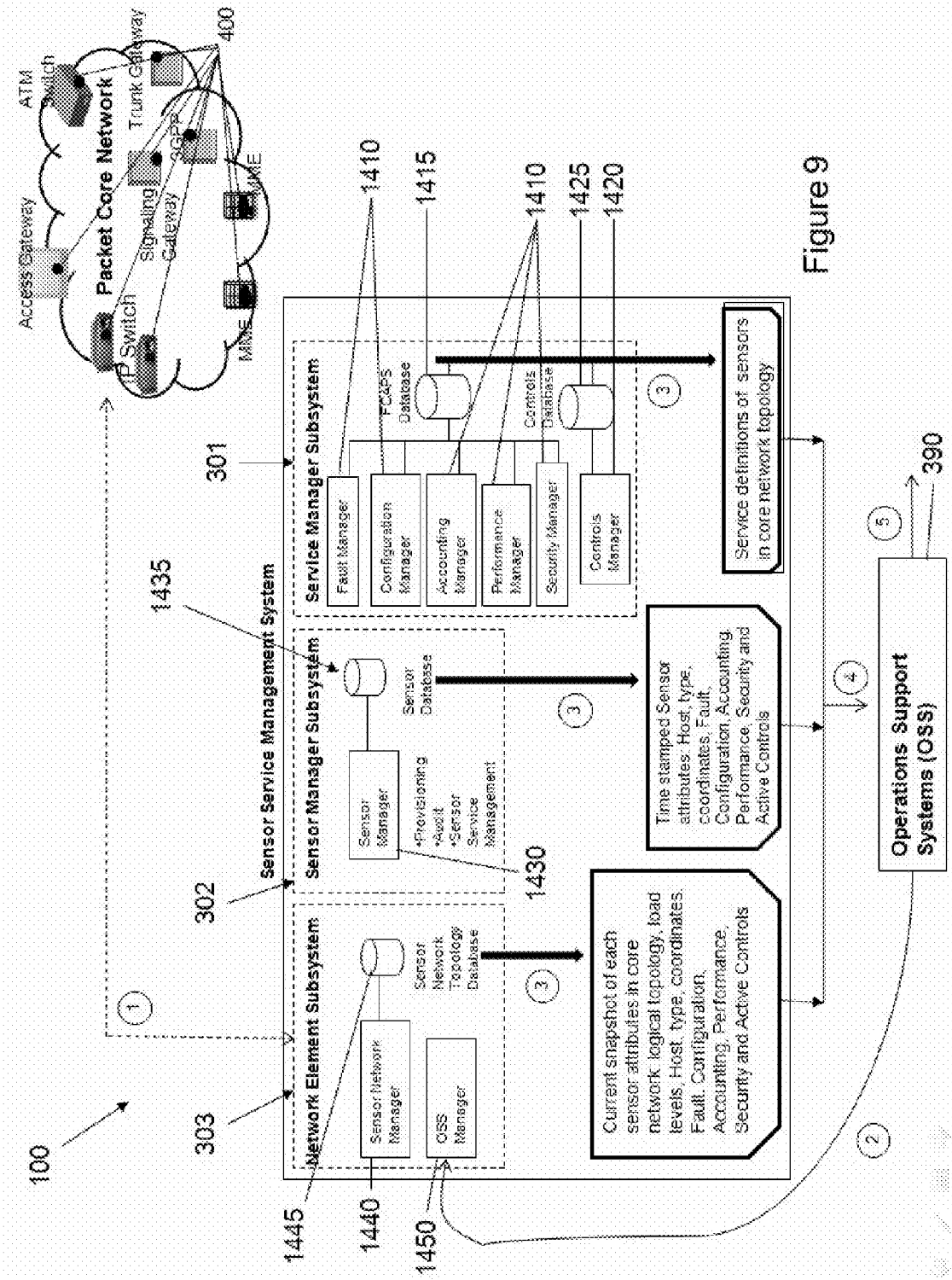
FIG. 9 is a schematic illustration of a real-time network management and control of a cluster.
Figure 14:
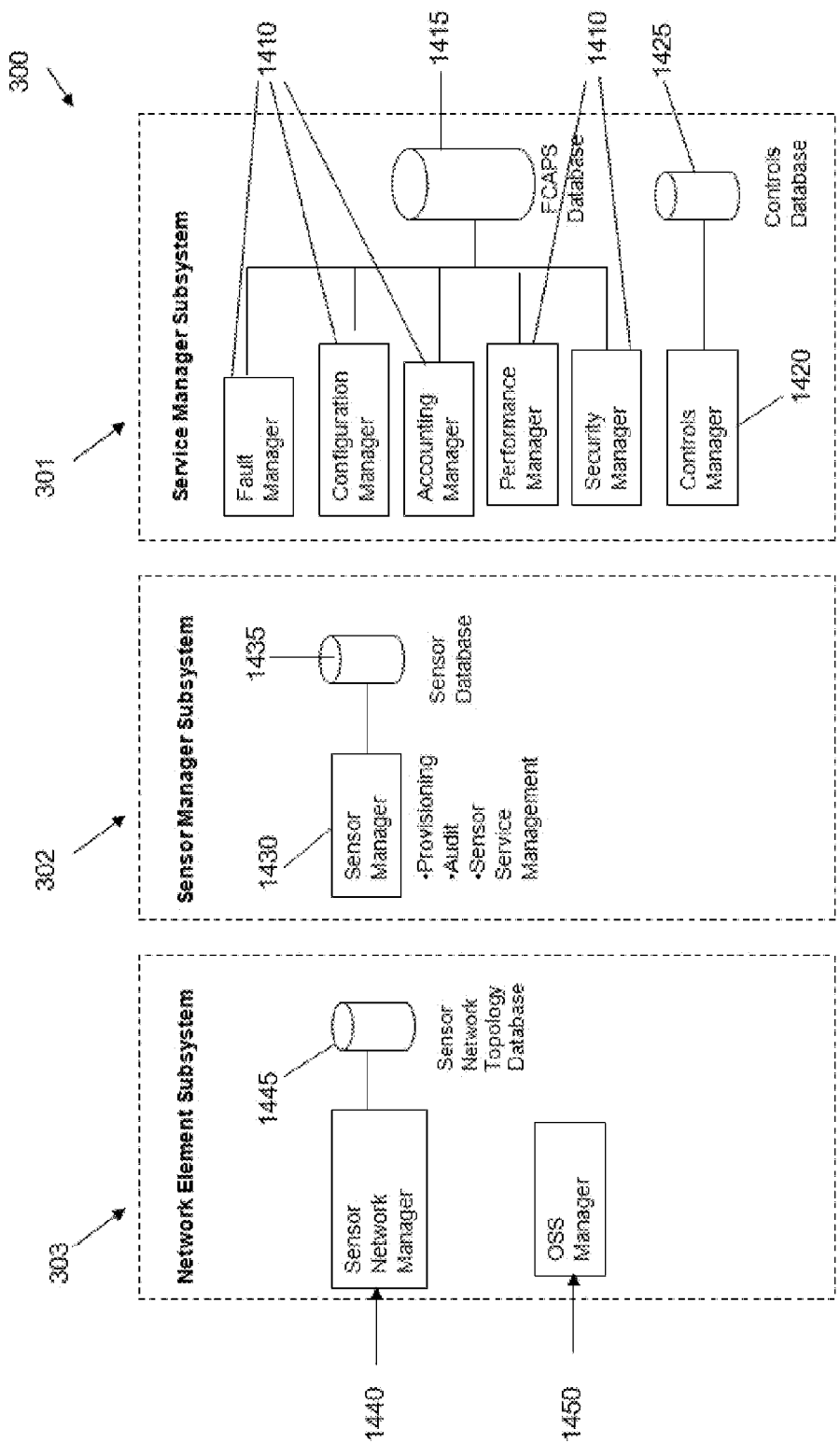
FIG. 14 is a schematic illustration of Sensor Service Management System.

With reference to FIG. 14 is an alternate non-limiting embodiment of the SSM 300. This embodiment of the SSM 300 may comprise three subsystems, a service manager subsystem (ServiceMS) 301, a sensor manager subsystem (SensorMS), and a network element subsystem (NetworkES) 303. The ServiceMS 301 may comprise a Fault manager, a configuration manager, an Accounting manager, a Performance manager, a Security manager (collectively referred to as "FCAPS") 1410, a FCAPS database 1415, a Control manager 1420, and a Controls database 1425. Each manager in the FCAPS 1410 may manage its own services. Each manager 1410 in the FCAPS 1410 may modify its own services. Modify means to create a mapping of what services exist in a given node. Each manager 1410 knows the mapping of where each service or services is deployed. Similarly, the control manager 1420 has a mapping of what types of controls are deployed at each node. Typically only management services are performed in the ServiceMS 301. For example, the states identified in FIG. 16 Table 1.0 may be monitored in the ServiceMS 301. The monitoring may provide the ServiceMS 301 with attributes of what service resides on what node, the type of node, and what the current state of the node may be. The SensorMS 302 may comprise a Sensor Manager 1430 and a Sensor database 1435. The Sensor Manager 1430 may perform provisioning, auditing or sensor service management. The SensorMS 302 may take the service that resides on the SSM 300 and provision the services on different nodes. The sensor database 1435 has a database of all the sensor services and where it may reside. The sensor manager 1430 may also initiate an audit of the sensors to verify what state they are in (i.e. active state, valid state). For example, if a user wants to retire a service, the sensor manager 1430 will perform an audit to see if the service exists on a given sensor. Once the results are returned from the audit, additional steps are taken to implement a service. The NetworkES 303 may comprise a Sensor Network Manager (1440), a Sensor Network Topology Database 1445, and an OSS Manager 1450. The Sensor Network Topology Database 1445 may provide the NetworkES 303 with information on how network clusters are arranged. An additional illustration of a real-time network management of a cluster and the inner-workings of the NetworkES 303 is shown in FIG. 9. With reference to FIG. 9, the HSE 400 or Supervisory HSE 450 (not shown) controls the sensors. The HSE 400 may send bit patterns to the NetworkES 303 or the SSM 300. This information may be stored in the Sensor Network Topology Database 1445 for a particular core network. The Sensor Database 1435 keeps at least two types of records. The current state and the previous state of the HSE 400. The previous state deployed is located in the sensor database 1435 and may be time stamped as to when the data was collected. The SensorMS 302, may provide a time stamped view of the core network to the OSS 390 or to the OSS manager 1450 who transmits the view to the OSS 390. The OSS 390 may then analyze the results and displays graphical simulations of traffic in the core network. Also the ServiceMS 301 may provide a definition of HSE 400 in the core network topology to the OSS 390 or it may go through the OSS manager 1450. Additionally, the OSS Manager 1450 may communicate with an OSS 390 via a GUI. It is possible to have a number of OSS 390 within the Model 100. If different OSSs 390 are present, there may be different interfaces to different protocols supporting the different OSSs 390. For example, when there is a query to determine what a network comprises, the sensor network topology database 1445 provides snapshots of each sensor attribute. These snapshots may reside within the sensor network topology database 1445, or may be delivered as a result of various information contained within the sensor network topology database 1445. The information from the sensor network topology database 1445 in then communicated to the OSS 390, either directly or via the OSS manager 1450, by pulling the information from the sensor network topology database 1445, or pushing the information from the NetworkES 303.

4. Heterogeneous Sensor Entity (HSE)

Figure 6:
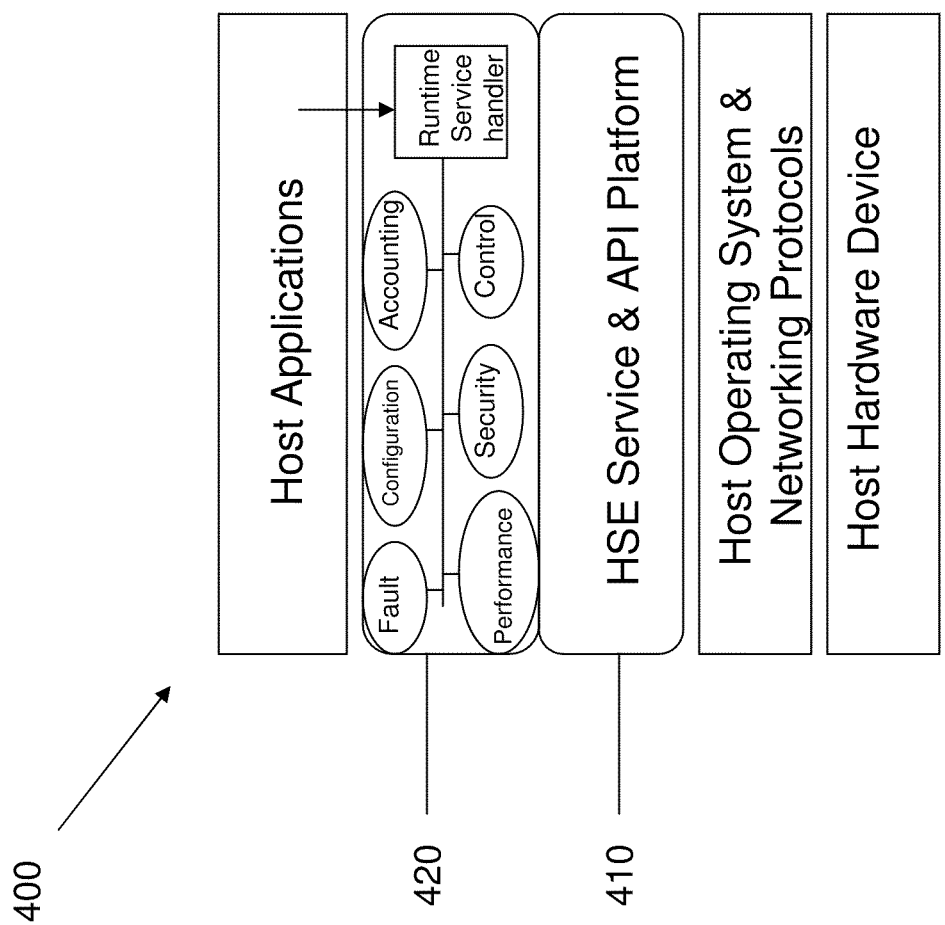
FIG. 6 is a schematic illustration of a heterogeneous sensor entity.

With reference to FIG. 6, an embodiment of a Heterogeneous Sensor Entity (HSE) 400, which may be embedded in an environment, such as a computer network, nodes, or network elements (i.e. routers including edge routers, core and access routers for example, switches, servers, or multiplexers may be used with sound engineering judgment). The HSE 400 may be dependant or independent of the device's hardware component. The architecture of the HSE 400 may comprise two distinct layers, a Service & API Platform (SAP) 410, and a HSE runtime service environment (RTSE) 420 as illustrated in FIG. 6. Runtime environment is an environment which may provide support services for processes or programs on a node. The SAP 410 is a middleware that may be embedded in a host and residing in a given node. The SAP 410 may provide support to the RTSE 420, and may provide access to the network protocols that already exists in the node. This support may include providing the RTSE 420 with privileged access to low-level host Operating System calls, utilization of the transport protocols and abstraction of the host hardware device. For example, when a system is running, there are specific functions that a user cannot be able to perform based on their level of access. The level of access not granted to a user is called a privilege access to the lower level protocols. Privilege access are functions that only a user labeled level 1 or level 0 can perform. 1 meaning you can perform a function, where 0 means you cannot perform a function. The 1 to perform or 0 not to perform a function may be reversed based on the desire of the programmer. The SAP 410 may provide the FCAPS and Control manager with privilege access to these lower level protocols. The SAP 410, having such access, becomes an integral part of the host due to this permission being granted while the system is running. Additionally, the SAP 410 may provide the RTSE 420 with runtime data-structures of pertinent host applications. Data structure means the application make-up/mapping. This allows the API to emulate the service, because it has this access to the structure. The RTSE 420 may provide support to the applications after the services are running on the nodes. The RTSE 420 may contain the executable network management services and controls. The executable services may be turned on/off via a host application layer (e.g. browser interface) if desired. The RTSE 420 may emulate the host applications and host hardware devices for fault, configuration, accounting, performance and security. The RTSE 420 may activate prescribed network management controls to enforce load balancing in real-time, and it may remove controls when the network traffic transitions to a stable state.

Figure 10:
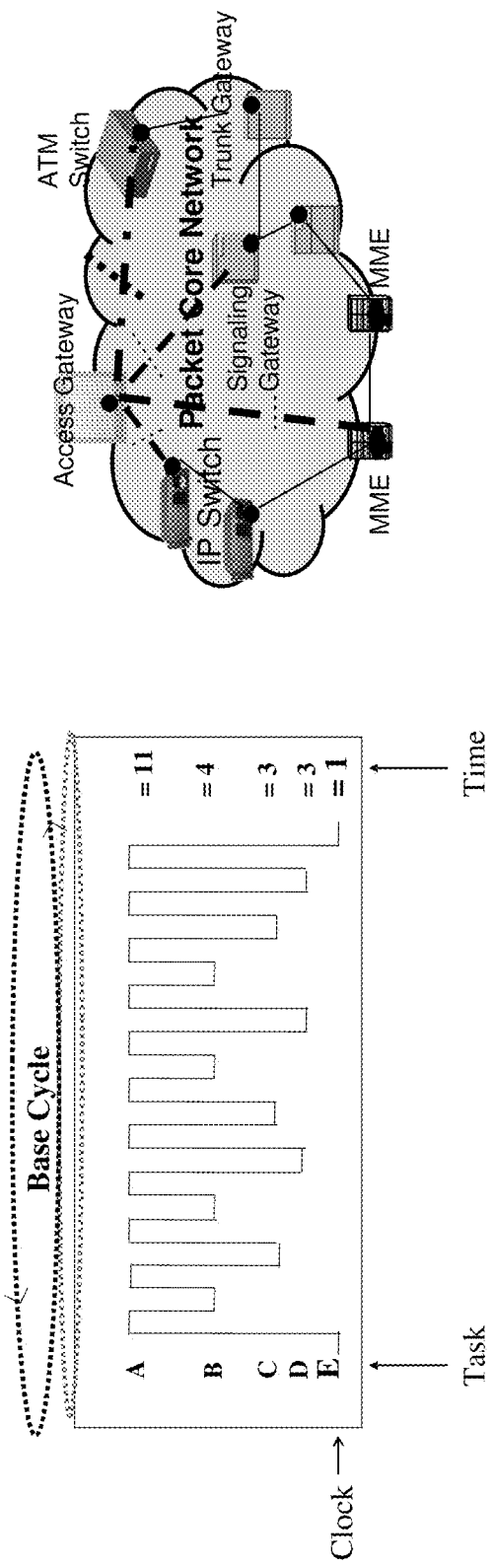
FIG. 10 is a schematic illustration of an embedded heterogeneous sensor entity automatically senses congestion within its node.
Figure 13:
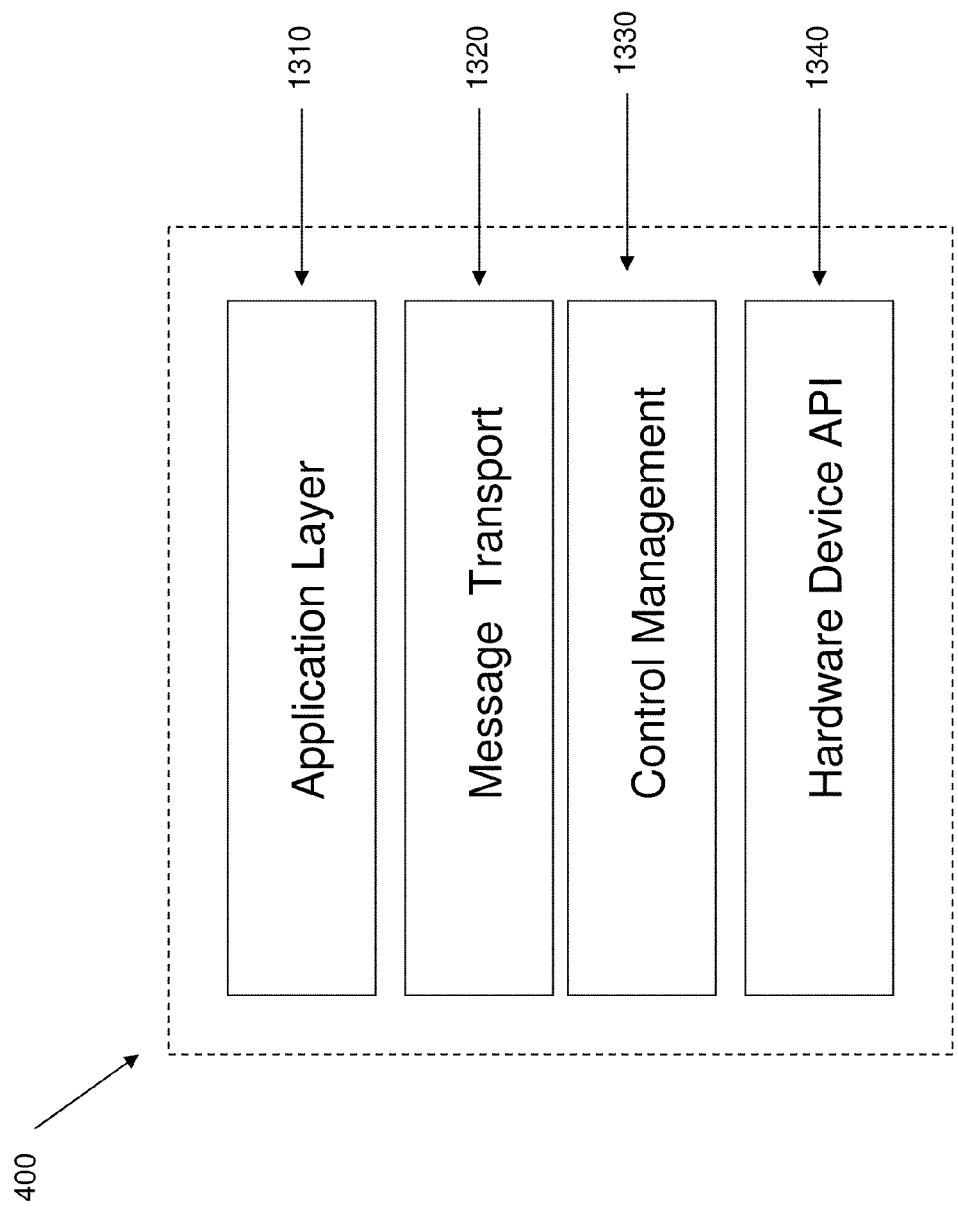
FIG. 13 is a schematic illustration of a second embodiment of a heterogeneous sensor entity.

With reference to FIG. 13, is another non-limiting embodiment of the HSE 400. In this non-limiting embodiment, the HSE 400 may comprise an Application Layer 1310, a Message Transport Layer (MTL) 1320, a Control Management Layer 1330, and a Low-Level Hardware Dependant Application Programming Interface (API) 1340 as illustrated in FIG. 13. The application layer 1310 hosts the service elements provisioned by the SSM 300. The Application Layer 1310 provides the runtime environment to emulate designated hardware device operations and to execute Decision Graphs. The MTL 1320 provides low-level messaging and Input/Output (I/O) communication. For example the MTL 1320 provides I/O for HSE 400 peer-to-peer, HSE 400 to HSE 450, HSE 400 to SSM 300, and Supervisory HSE 450 to SSM 300 communications. The Control Management Layer 430 implements, activates, and removes network management controls. The network control activation and removal is based on real-time performance data. For example, when the HSE 400 or supervisory HSE 450 detects an internal stimulus, it analyzes the performance data, then the controls are activated or removed depending on the results of the real-time analysis. One purpose of having the ability to activate, remove and modify controls is to keep network operation near max efficiency under network anomalies, and to alter network traffic flow based on admin policies and objectives. The Lower-Level Hardware Dependent API 1340 provides an abstraction of hardware resources for measuring functions. These functions may include fault, configuration, accounting, performance, and security metrics. The HSE 400 stores network administrative policies in directories, and retrieves and interprets administrative policies prior to implementing network management controls. The HSE 400 hosts customized network management service elements, and provides runtime environment for autonomous network management monitoring and control function. The HSE 400 behavior is based on its managed device's state and local surroundings, each state and surrounding may have different characteristics from other managed devices within the same cluster. Additionally the HSE 400 may be provisioned by the SSM 300 with supervisory functioning capabilities for managing HSE(s) 400 in its network cluster. Each network cluster may include a supervisory HSE 450, which coordinates the network management and control activity of the HSE 400 within its network cluster. An example of a benefit of having a supervisory HSE 450 is when an HSE 400 located within a cluster becomes unreachable. The supervisory HSE 450 may now serve as a conduit to the remainder of the Model 100. The architecture of the supervisory HSE 450 may be identical to the architecture of the HSE 400. Additionally, HSE 400 may communicate with additional HSE(s) 400 in real-time, which may prevent the system from overloading or experiencing congestion. For example, FIG. 10 illustrates the HSE 400 assisting with Automatic Congestion Control (ACC). When the node level cycle exceeds a predetermined length of time to complete assigned tasks, for reason such as additional work load, the HSE 400 senses the congestion within the node, sends ACC indicators bit-mapped vectors to an HSE 400 or supervisory HSE 450, depending on the framework, and the neighboring HSE(s) 400. The HSE 400 may instruct other HSEs 400 to avoid using the node a form of facilitating traffic. In real-time the other nodes will take the troubled node off of the routing table, and tells the other nodes to use a secondary route until the trouble node responds saying it is okay to continue traffic using the once troubled node. The supervisory HSE 450 or the neighboring HSE(s) 400 or both may activate controls that normalize the node in real-time. Additionally, the HSE 400 or Supervisory HSE 450 may activate controls to reroute traffic around the Access Gateway until the congestion in the network is resolved. Once the node base level cycle takes its normal time to complete the assigned task, the HSE 400 sends normal ACC indicators to the supervisory HSE 450 or neighboring HSE(s) 400 or both, which continues to remove the previously activated controls. Additionally, the HSE 400 communicates with the SSM 300 to facilitate real-time network management and control operations.

Additionally, the HSE 400 may provide abstractions of hardware resources for measuring FCAPS metrics. The HSE 400 detects, counts, and reports parameters using bit patterns (1's and 0's) or by any other means known to a person having ordinary skill in the art. For example, the HSE 400 may send bit patterns to the Supervisory HSE 450 or SSM indicating what type of hardware is experiencing problems. The abstractions allow the HSE 400 to detect faults, network overload traffic, intra-node congestions, adjust configuration, access parameters, and to implement and remove network management controls.

Figure 11:
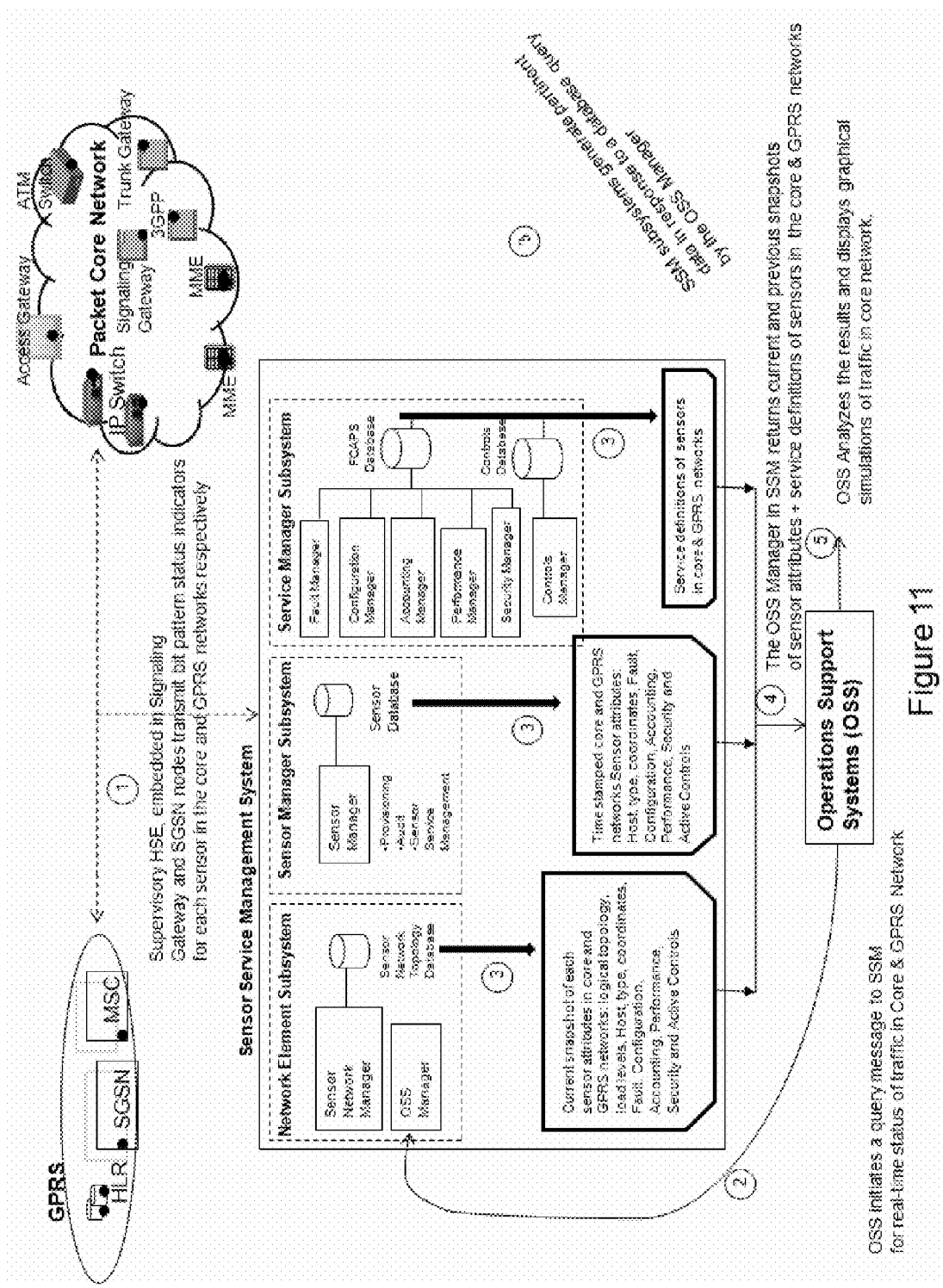
FIG. 11 is a schematic illustration of analysis of real-time multimedia network traffic management and control operations.
Figure 12:
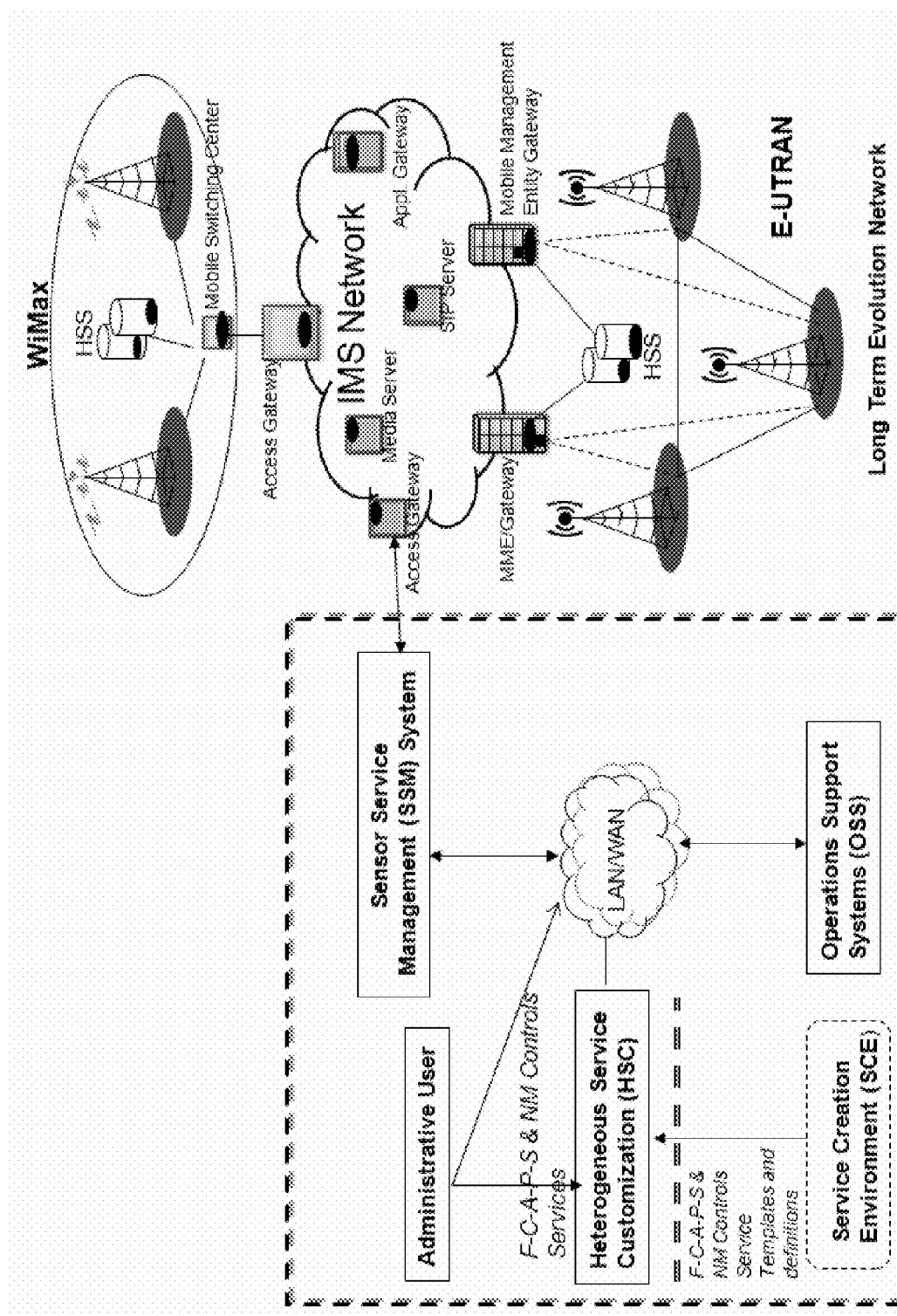
FIG. 12 is a schematic illustration of real-time Multimedia Network Traffic Management system framework for 4G wireless broadband networks as an example.

In another non-limiting embodiment the Model 100 further comprises a Supervisory Heterogeneous Sensor Entity (CHSE) 455. The CHSE 455 may perform real-time communication with the SSM 300. The architecture and characteristics of the CHSE 455 may be identical to the HSE 400 or supervisory HSE 450. The CHSE 455 may use the same communication methods as the HSE 400 or the supervisory HSE 450. The CHSE 455 may be provisioned by the SSM 300 with supervisory functioning capabilities identical to the supervisory HSE 450. The CHSE 455 may be present in the Access 710 or Core 720 network clusters with other HSE(s) 400 where a supervisory HSE 450 is not present. An example of a schematic illustration of analysis of real-time multimedia network traffic management and control operations is shown in FIG. 11. With reference to FIG. 11, the OSS 390 performs a query for a GPRS and a Packet Core Network. This figure shows how the OSS 390 may communicate with different types of networks. Additionally, different networks can communicate with one another using the SSM 300. For example, the HSE 400 in the GPRS and Packet Core Network detect various counts for the dominant network parameters then notify their respective HSE 400 to perform an analysis of their network cluster. If the GPRS is in trouble, the SSM 300 can sense where the trouble or congestion is coming from, thus making the network is reliable by pinpointing the problem.

Each HSE 400 activates network management controls in the cluster based on the analysis. The HSE 400 then sends an update to the SSM 300. The SSM 300 creates a snapshot of the GPRS and the Packet Core network domains by updating the View 383 of the GPRS and the Packet Core network domains in real-time. The SSM 300 then notifies OSS 390 to perform a detailed network management analysis of the affected network domain. Additionally, both the CHSE and HSE may include two types of executable: FCAPS and Managerial. Any HSE may assume the role of a CHSE when its Managerial and FCAPS executables are both turned ON. In the case when there is an HSE, FCAPS is ON but the Managerial component is OFF.

Figure 15:
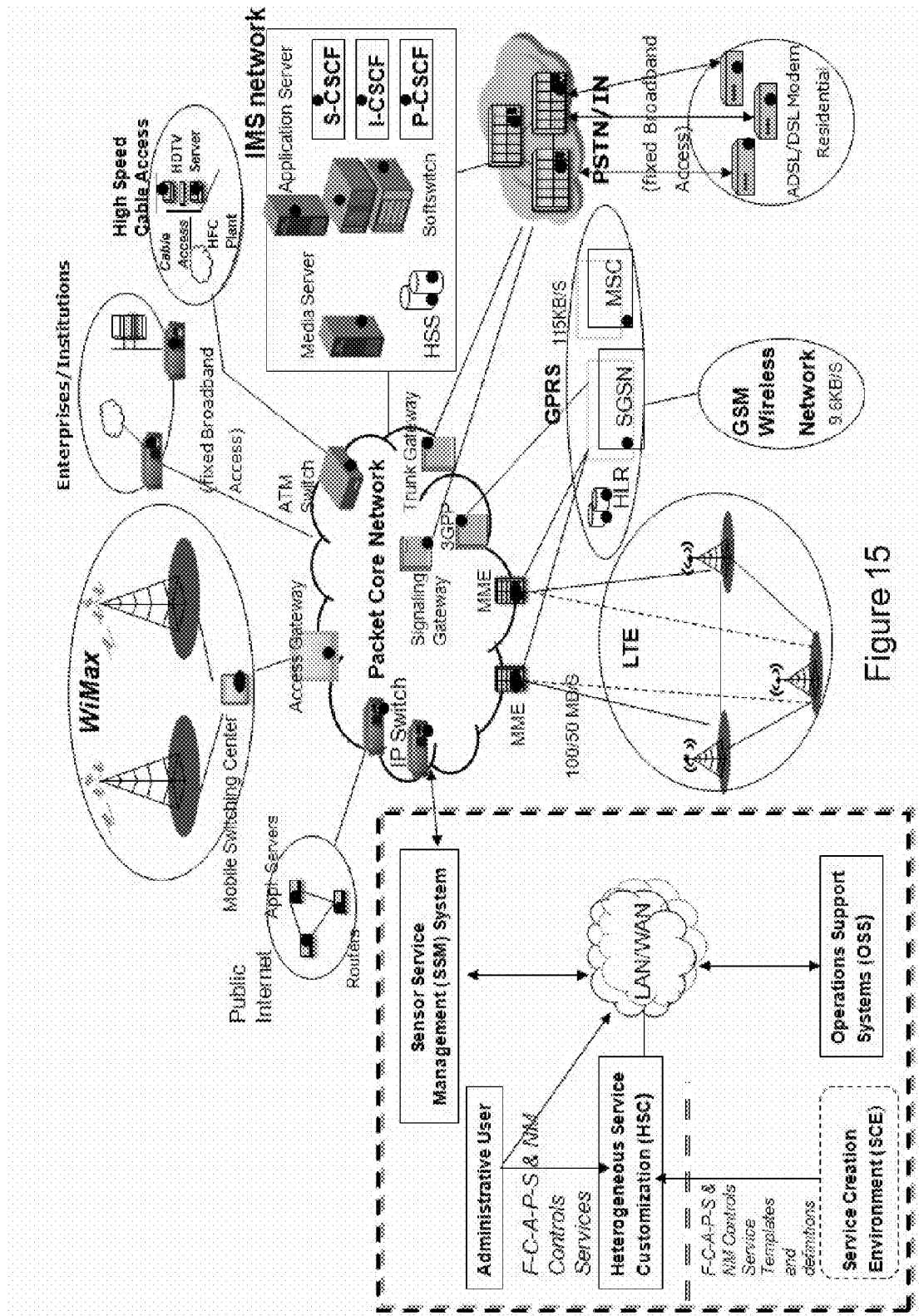
FIG. 15 is a schematic illustration of real-time Multimedia Network Traffic Management system framework for 4G wireless networks and converged heterogeneous networks as examples.

With reference to FIG. 15, a Multimedia Network Traffic Management system framework for converged heterogeneous networks is shown. The Model 100 is shown communicating with different network types (i.e. WiMax, LTE, GPRS, GSM Wireless, IMS, PSTN/IN, or any other types of networks known to a person having ordinary skill in the art). Older network types may also communicate using the Model 100 to communicate with similar or newer technologies. Additionally, different network types may communicate with other networks that are different from their own. The HSE 400 may also communicate with neighboring HSEs 400 positioned on different network types. The SSM 300 continuously monitors each different network type in real-time.

Figure 17:
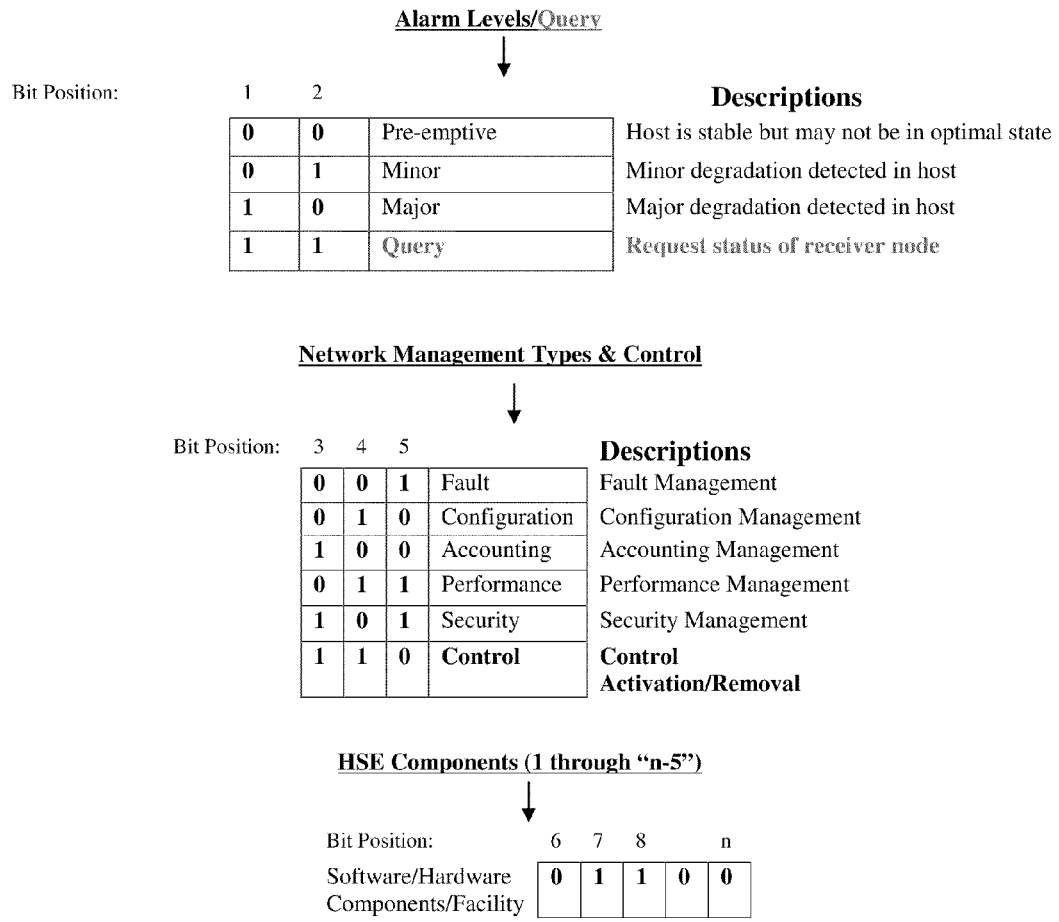
FIG. 17 is an illustration of various fields for a Bit Vector Analysis in accordance with an embodiment of the present invention.
Figure 1B:
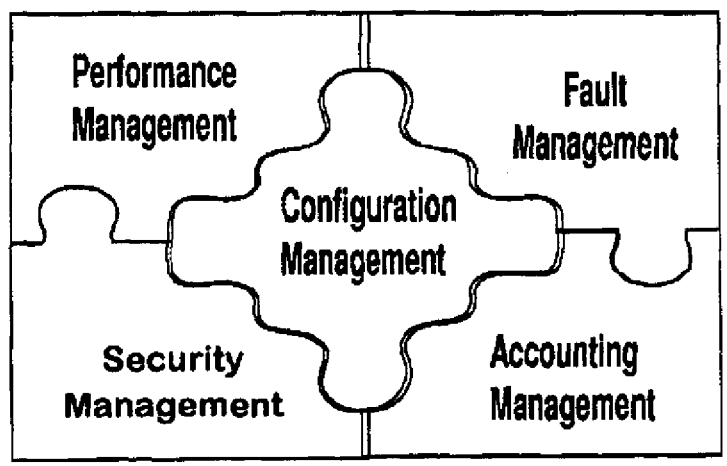

With reference to FIG. 17, a Bit Vector Analysis is shown. The Alarm-Level Indicators may be uniquely identified by the permutations in bit positions 1 and 2. An originating HSE (or CHSE) may send the Query indicator to recipient HSE to request the status of the recipient's host. Network Management Types may be uniquely identified by the permutations in bit positions 3, 4 and 5. The bit positions 6, 7, 8, . . . through "n", map to components (e.g., processes, hardware, application, resources, drivers, external interfaces etc.) $1, 2, \ldots$ "n–5" for a given HSE. For example, when the bit value is set to 1, it indicates that the component has an alarm level specified by the permutations in bit positions 1 and 2 for the network management type specified by permutations in bits 3, 4 and 5. A zero bit value may indicate optimal functionality of the associated HSE component.

With continued reference to FIG. 17, and now FIG. 18, examples of bit vector diagnosis is shown. Example 1 illustrates the sending/originating HSE/CHSE's host in optimal state. Example 2 illustrates the sending/originating HSE/CHSE's host is stable, but a slight performance degradation is detected in component #3. Example 3 illustrates a minor alarm in the configuration of component #4 for sending/originating HSE/CHSE's host. In Example 4, the host HSE (or CHSE) sends a Query message to other HSEs for status of their security levels. In Example 5, the HSE (or CHSE) sends an optimal security levels for its host (Notice that bit positions 6, 7, 8, . . . , "n" are set to 0). In Example 6, the HSE (or CHSE) sends a stable, but less optimal security level due to security status of host's component #2. In Example 7, the HSE (or CHSE) sends a minor security alarm indicator associated with the host's component #1.

While the invention has been illustrated and described with respect to various examples and applications (i.e. use with 4G networks), the same is to be considered as illustrative and not restrictive in character. Older networks types (i.e. 1G-3.5G etc.) that may be operable in specific areas are still capable of being managed by the invention described herein, and it being understood that only illustrative embodiments thereof have been shown and described. All changes and modifications that come within the spirit of the invention described by the following claims are desired to be protected. Additional features of the invention will become apparent to those skilled in the art upon consideration of the description. Modifications may be made without departing from the spirit and scope of the invention.

What is claimed is:

1. A method for real-time management of wireless and converged networks, comprising steps of:
   determining a network topology including a plurality of network clusters having a plurality of network elements;
   providing a management system to define and maintain a master copy of network configurations, sensor attributes and said plurality of network elements;
   said management system deploying sensors to the plurality of network elements, wherein each of said sensors emulates a respective element to which each of said sensors is deployed;
   said sensors determining which information items of said network elements are of a type which must change in real-time based on a pre-emptive diagnostics of said network elements and said network clusters;
   said sensor systems generating instructions to the management system and other sensors using bit mapped vectors to represent a real-time status of said network elements, and one or more of fault, configuration, performance, accounting, security, and control network management types and services in the wireless and converged networks and controls, and non-optimal components of network elements;
   responsive to said instructions from said sensor systems, a plurality of recipient sensors performs real-time analysis and determines corrective actions to maintain optimal network operations and network services;
   responsive to said real-time analysis, said recipient sensors provide real-time information to said management system;
   responsive to said real-time analysis from said recipient sensors, said management system updates the master copy of the network topology and said network element attributes; said management system instructs operation support systems about the real-time status of the network and components of the said network elements; and wherein said management system is configured to create a service element based on a requirement of a sensor entity;
   identifying a supervisory sensor for each of said plurality of network clusters among said sensors;
   determining at least one of said sensors is an unreachable sensor; and
   routing traffic around said unreachable sensor through said supervisory sensor to manage communication among said sensors and across network clusters and network elements in response to said determination.

2. The method of claim 1 further comprising a step of: said sensor systems performing real-time control of heterogeneous streams of services in the wireless and converged networks.

3. The method of claim 1 further comprising the steps of:
   said management system performing real-time provisioning of one or more heterogeneous streams of network management types and services in the wireless and converged networks.

4. The method of claim 1 further comprising the step of:
   a service creation system and said management system performing service version management for network management types and service instances.

5. The method of claim 1, wherein the supervisory sensor manages communication routing between and among said sensors and said management system.

6. The method of claim 1, further comprising:
   diagnosing a fault, configuration, security failures, and performance degradation in real-time based on shared intelligence between two or more of said sensors based on the one or more of the network management types and services; and
   correcting fault, configuration, security failures, and performance degradation in real-time based on said shared intelligence between the two or more of said sensors based on the one or more of the network management types and services.

7. A network management system for real-time management of wireless and converged networks comprising:
   a management system having at least a first sensor service configured to define and maintain a master copy of network configurations, sensor attributes and network elements;
   a network topology database including network topology information related to said network elements and one or more network clusters that facilitates data sharing between at least said network elements;
   a plurality of sensors each configured to respectively emulate one of said network elements;
   said sensors further configured to determine which information items of said network elements are of a type which must change in real-time based on a pre-emptive diagnostics of said network elements and said network clusters;
   said sensors configured to generate instructions to the management system and other sensors using bit mapped vectors representative of the real-time status of network elements, and one or more of fault, configuration, performance, accounting, security, and control network management types and services in the wireless and converged networks, and controls, and non-optimal components of network elements;
   a recipient sensor responsive to said instructions from said first sensor service and configured to perform a real-time analysis and determine corrective actions to maintain optimal network operation and network services;
   said management system configured to update the master copy of the network topology database in response to reception of topology information related to one or more of said network elements from said sensors emulating said network elements, said network element attributes in response to said instructions from said sensor service;
   said sensor service configured to instruct operation support systems about the real-time status of the network and components of the said network elements;
   wherein said management system is configured to create a service element based on a requirement of a service entity; and
   a supervisory sensor for each of said plurality of network clusters among said sensors;
   a determination that at least one of said sensors is an unreachable sensor; and
   wherein traffic is routed around said unreachable sensor through said supervisory sensor to manage communication among said sensors and across network clusters and network elements in response to said determination.

8. A system, comprising:
   a service creation system that creates at least one service performing a network management task for a wireless and converged networks;

a management system to define and maintain a master copy of network configurations, sensor attributes and said plurality of network elements;

a topology database of the management system that describes a network topology of the network to the management system and one or more network clusters that facilitate data sharing between at least said network elements;

sensors deployed to the plurality of network elements, wherein each of said sensors emulates a respective element to which each of said sensors is deployed to produce performance data related to the network;

said sensors further configured to determine which information items of said network elements are of a type which must change in real-time based on a pre-emptive diagnostics of said network elements and said network clusters;

said sensors generating instructions to the management system and other sensors using bit mapped vectors to represent a real-time status of said network elements, and one or more of fault, configuration, performance, accounting, security, and control network management types and services in the wireless and converged networks and controls, and non-optimal components of network elements, wherein said management system updates the master copy of the network topology and instructs operation support systems about the real-time status of the network and components of the said network elements; and wherein said management system is configured to create a service element based on a requirement of a sensor entity;

a supervisory sensor for each of said plurality of network clusters among said sensors;

said supervisory sensor determining if at least one of said sensors is an unreachable sensor; and causing the rerouting of traffic around said unreachable sensor to manage communication among said sensors and across network clusters and network elements in response to said determination.

9. The system of claim 8, wherein the at least one service is selected from a group consisting of fault management, configuration management, accounting management, performance management, and security management and combinations thereof.

10. The system of claim 8, further comprising a control system for controlling two or more network nodes that facilitates substantially real-time end-to-end network management by modifying operation of at least one of the two or more network nodes.

11. The system of claim 8, further comprising a new node system that generates a new sensor entity based at least in part on detection of a new node and a node type of the new node.

12. The system of claim 8, wherein the management system deploys the at least one service to two or more network nodes in the network, and two or more sensor entities emulate the two or more network nodes.

13. The system of claim 12, further comprising:
a template creation system that creates at least one node template to emulate the two or more network nodes; and
a template database that stores the at least one node template.

14. The system of claim 13, wherein the template creation system creates the node template to emulate a new node of an unknown node type based at least in part on detection of the new node and one or more processes running on the new node.

15. The system of claim 12, wherein the two or more network nodes are of a known node type, the known node type includes an identification of one or more signaling systems, routers, switches, servers, multiplexers, Customer Premise Equipment, personal computer systems, PDAs, mobile devices, cell phones and combinations thereof.

16. The system of claim 12,
wherein said network cluster having a plurality of nodes;
and a supervisory sensor entity that receives emulated node data from at least one sensor entity and provides the emulated node data to at least the management system.

17. The system of claim 16, further comprising a supervisor selection system that selects the supervisory sensor entity based on one or more of connectivity outside the network cluster, a traffic level of a node among the two or more network nodes, and a node type of the node among the two or more network nodes.

18. The system of claim 16, wherein the supervisory sensor entity further manages traffic routing between the two or more network nodes.

19. The system of claim 12, wherein a first sensor entity among the two or more sensor entities transmits node information related to a first network node among the two or more network nodes to a second sensor entity among the two or more sensor entities.

20. The system of claim 19, wherein the second sensor entity is a supervisory sensor entity.

21. The system of claim 19, wherein the node information includes at least traffic information related to the first network node.

22. The system of claim 12, further comprising an analysis system of the two or more sensor entities that analyze traffic related to the two or more network nodes in real-time.

* * * * *

UNITED STATES PATENT AND TRADEMARK OFFICE
CERTIFICATE OF CORRECTION

Figure 1B:
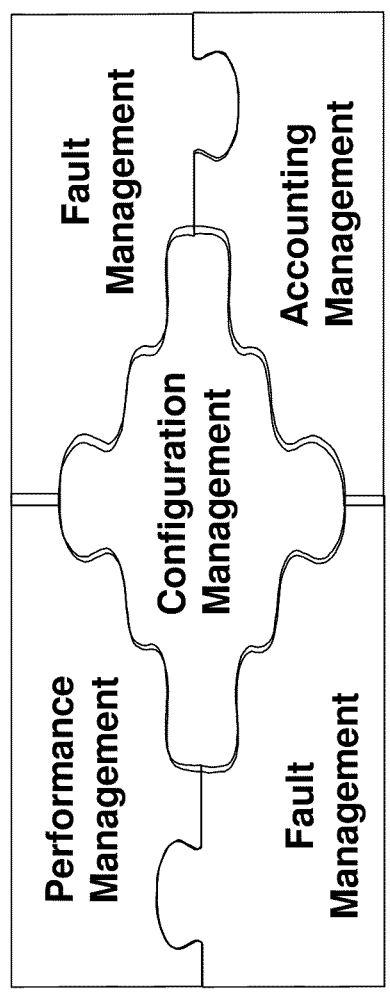
FIG. 1(b) is a schematic illustration of network management functions (prior art)

PATENT NO.       : 8,868,725 B2
APPLICATION NO.  : 12/813233
DATED            : October 21, 2014
INVENTOR(S)      : Augustine S. Samba It is certified that error appears in the above-identified patent and that said Letters Patent is hereby corrected as shown below:

IN THE DRAWINGS:

Delete Fig. 1(b) and replace with attached Fig. 1(b).

Signed and Sealed this
Seventh Day of April, 2015

Michelle K. Lee
*Director of the United States Patent and Trademark Office*